(12) United States Patent
Serrano

(10) Patent No.: US 6,431,078 B2
(45) Date of Patent: Aug. 13, 2002

(54) AUTONOMOUS TRANSPORT SYSTEM

(76) Inventor: Jorge Serrano, De Los Aromos 6230, Palomar, Buenos Aires 1684 (AR)

(*) Notice: Subject to any disclaimer, the term of this patent is extended or adjusted under 35 U.S.C. 154(b) by 0 days.

(21) Appl. No.: 09/729,631

(22) Filed: Dec. 5, 2000

(30) Foreign Application Priority Data

Jan. 13, 2000 (AR) ................................. 00 01 00142

(51) Int. Cl.$^7$ ................................................ B61B 3/00
(52) U.S. Cl. .................... 104/91; 104/93; 104/106; 105/156; 187/245
(58) Field of Search .................... 104/89, 91, 93, 104/106; 105/153, 156, 154, 152, 150, 149.1; 187/245, 255, 401, 404, 406, 409, 411

(56) References Cited

U.S. PATENT DOCUMENTS

| | | |
|---|---|---|
| 631,988 A | 8/1899 | Feldmann |
| 3,495,545 A | 2/1970 | Radovic .................. 104/89 |
| 3,541,962 A | 11/1970 | Avery .................... 104/25 |
| 3,698,326 A * | 10/1972 | Schurch et al. .......... 105/156 |
| 3,730,103 A | 5/1973 | Weaver ................... 105/141 |
| 3,831,714 A * | 8/1974 | Hedman et al. ........... 187/245 |
| 3,922,970 A | 12/1975 | Glastra ................... 104/91 |
| 3,937,147 A * | 2/1976 | Szent-Miklosy, Jr. ...... 104/93 |
| 3,987,734 A | 10/1976 | Horn ..................... 104/88 |
| 4,015,537 A | 4/1977 | Graef et al. ............. 104/91 |
| 4,411,336 A * | 10/1983 | Anders ................... 186/37 |
| 4,503,778 A | 3/1985 | Wilson ................... 104/28 |
| 4,520,732 A * | 6/1985 | Schwarzkopf ............. 104/89 |
| 4,671,186 A | 6/1987 | Kunczynski .............. 104/168 |
| 4,693,186 A | 9/1987 | Lisa ..................... 105/329.1 |
| 4,821,845 A * | 4/1989 | DeViaris ................. 187/245 |
| 5,058,508 A | 10/1991 | Kavieff et al. .......... 105/149 |
| 5,289,778 A | 3/1994 | Romine ................... 104/130 |
| 5,372,072 A * | 12/1994 | Hamy ..................... 104/93 |
| 5,492,066 A * | 2/1996 | Nozaki et al. ............ 104/93 |
| 5,836,423 A * | 11/1998 | Kunczynski .............. 187/245 |

* cited by examiner

Primary Examiner—S. Joseph Morano
Assistant Examiner—Lars A. Olson
(74) Attorney, Agent, or Firm—Crowell & Moring LLP

(57) ABSTRACT

An autonomous transport system is disclosed, formed by four main subsystems: a channel subsystem; a vehicle subsystem; a wheel guide subsystem and central control station subsystem. The system is designed for the transportation of people or goods, to be used in tall buildings and in small and large scale urban environments. It comprises unitary vehicles that may move in different directions: horizontal, steeply sloped and also vertical tracks, thanks to novel traction wheel assemblies that roll on carefully designed wheel tracks. The system's cabin maintains the horizontal level/position regardless of the changes of track direction or slanting thanks to pendulum based automatic level control and may rotate up to 180° under normal conditions and even a full 360° turn respect to the wheel assembly in space restricted positions. The cabin is mounted on a cantilever, thereby displacing its center of gravity respect of the wheel guides. Thus, a lever action is established, which presses the wheels against the wheel tracks and therefore enough frictional resistance is obtained so as to avoid wheel slippage on the wheel tracks. The vehicles are moved by non-polluting, electric drives that move and stop them with high energy savings. The vehicle runways are designed taking in account safety features against fire hazards. Several vehicles may be used at the same time and on the same track and may run individually or in groups, conforming a train. The system allows for vehicles to be parked in bypassed positions or else they may be disengaged from the convoy to be used individually.

110 Claims, 28 Drawing Sheets

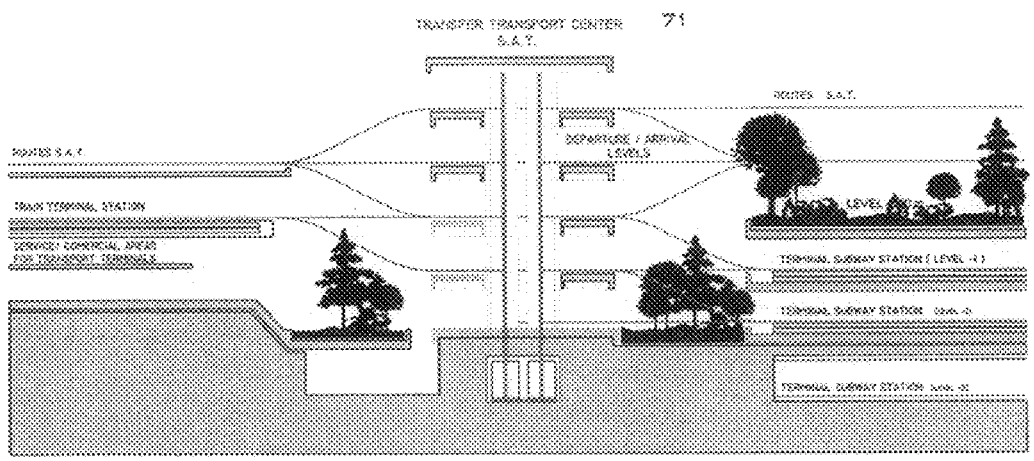

| | Speed in Km/h | Average | Time Km | Time 100m |
|---|---|---|---|---|
| Station | 0 | 30 | 8 | 8 |
| 100 m | 60 | 30 | 8 | 16 |
| 200 m | 60 | 30 | 24 | 32 |
| 300 m | 60 | 30 | 40 | 32 |
| 400 m Station | 0 | 30 | 48 | 16 |
| 500 m | 60 | 30 | 56 | 32 |
| 600 m | 60 | 30 | 72 | 32 |
| 700 m | 60 | 30 | 88 | 32 |
| 800 m Station | 0 | 30 | 96 | 16 |
| 900 m | 60 | 30 | 104 | 32 |
| 1000 m | 60 | 30 | 120 | 32 |
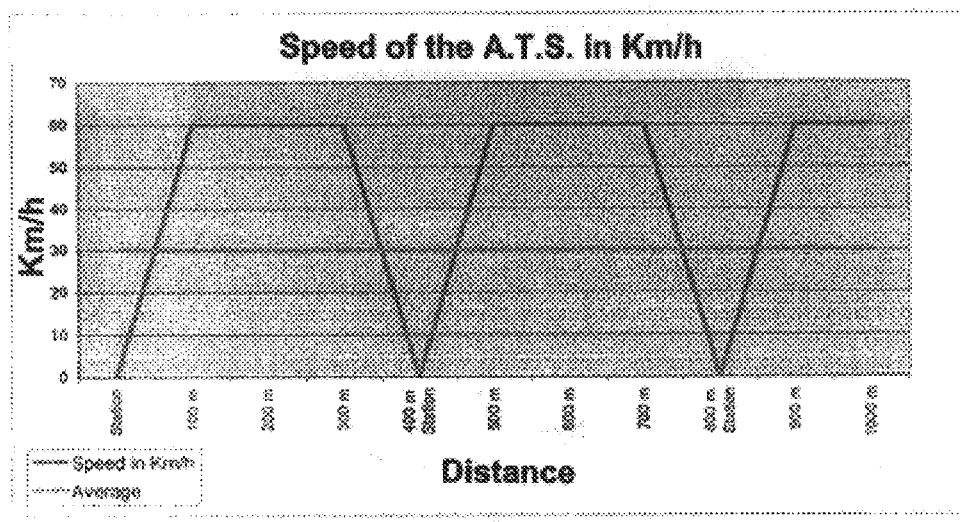
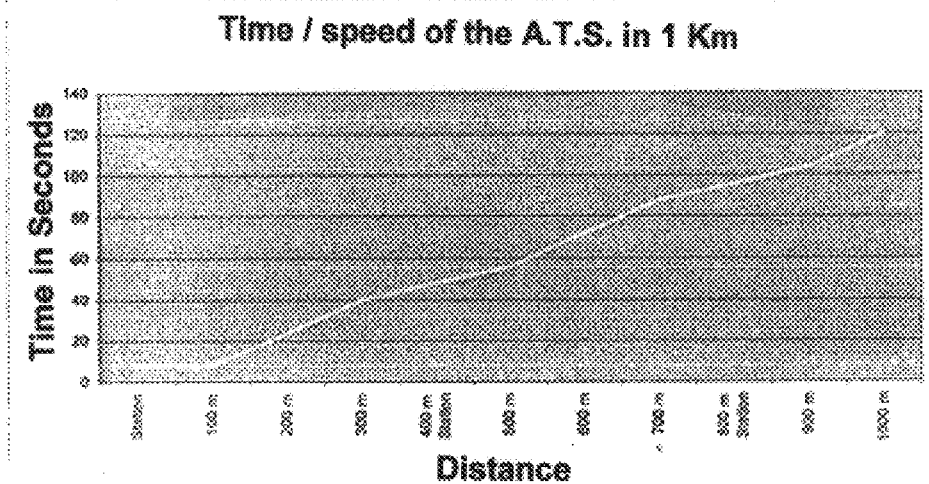
FIG. 21

AUTONOMOUS TRANSPORT SYSTEM

The present application claims priority of the Argentine patent application No. P00 01 00142, which was filed on Jan. 13, 2000, in the name of the same applicant.

FIELD OF THE INVENTION

The present invention relates to a transport device for horizontal, sloped and vertical movement, for carrying people or goods.

BACKGROUND

The present invention is particularly adequate for being used in large buildings (not only tall but also wide spread ones), and in small and large scale urbanization projects. The system of the present invention can interact with other systems. It may replace trains in flat ground, elevated monorails, cogwheel, rack railways and the well known elevator, covering all the ground transport means that run on rails. It may work either as an individual vehicle (in a building or in a group of buildings), or forming a convoy, by engaging individual units. It may act on steep slopes, vertical or horizontal guides or channels.

When transport interference appears within the city, the mobile device of the present invention may cover wide areas, connecting different geographical spots, without level or height limitations. In terms of 'use', it may offer a wide range of operations scales. This means: it can either connect transport terminals such as buses, airports, docks with smaller scale terminals on urbanized areas, towns or cities, or even apartment floors. Its route may start in an underground terminal, travel horizontally and switch from this circuit to a vertical one, or switch to an inclined one with different slopes, or rise above ground level.

The transport device may be considered autonomous due to all the above mentioned features, meaning by this that it does not depend nor rely on other transport means, being self-sufficient and self-reliable.

As an illustrative example: when an ordinary railway means needs to change from a ground level to another, it has to rely on complementary transport means, for example on a cog railway. In those cases, both interact with each other. They may also require further adjustments in their own drive and guide elements, such as, for e.g. widening curve radii.

The stopping action of the vehicle is gentle and smooth because it is carried out in several differentiated steps. In a first step the drive engine acts as a direct current electric generator adding mechanical load and wasting mechanical energy, thus obtaining decrease in speed; and, in a second step, the hydraulic disc-brake system takes care of movement till coming to complete stop.

PRIOR ART

Known vertical transport devices such as elevators use cables and engine rooms and have height limitations. Transportation devices for steep slopes also use cables or racks and their cabin does not keep a horizontal position while moving. The present invention replaces, by means of the use of an autonomous transport system, the different means of transport known today: the elevator (moving vertically), the cogwheel or rack railway train (for steep sloped tracks) and the different types of trains for relatively horizontal ground. The way the present invention solves vertical displacement may look similar to the elevator. However this is not so, because it does not depend on cables nor does it use engine rooms, and has therefore no height limitations. The way the present invention climbs steep slopes may look similar to the cogwheel railway or to the rack railway on the mountain. Furthermore its movement on horizontal ground could be compared to an ordinary train. However, one of the advantages of the present invention related to the cogwheel railway is that its cabin is always leveled, no matter how steep the slope may be. Regarding an ordinary train, the present invention allows to perform several movements in various directions, in such a way an ordinary train would lose balance and turn over. Since the device of the present invention travels on rubber wheels forming a long traction set, it will run smoothly even when changing the direction or traveling on a curve, thanks to the perfect adapting performance given by the articulation of the sub chassis of each set of wheels to the wheel guides.

U.S. Pat. No. 631,988 (W. Feldmann), describes an articulated suspension appliance for elevated railways. It describes a transport device, similar to a funicular passenger ropeway but showing an improved linkage that avoids swaying. It moves horizontally and in slopes of up to 45° and its cabins move all together. The device of the U.S. patent does not anticipate the technique of the present invention because the former may not move in vertical, horizontal or sloped directions and each of the cabins forming it is not independent of the other. Therefore, the device of the U.S. patent does not allow for transport capacity, speed and versatility as the one of the present invention.

U.S. Pat. No. 3,495,545 (Z. Radovic) describes a closed, non autonomous transport system, based on a monorail which has a chain or cable traction means, the latter moving a set of containers equally separated one from the other. However, the mentioned patent does not overlap with the present invention because the vehicles described in the U.S. patent have no individual mechanical driving means and therefore may not act as autonomous transport vehicles.

U.S. Pat. No. 3,541,962 (W. Avery) describes a closed monorail which is moved by a cable, and is formed by hanging vehicles which may not move in vertical motion, they may not move by themselves individually and may not move resting on their own rail or with their rail at one side. The document describes a movable access platform and the overall function is that of a funicular passenger ropeway since the vehicles are equally separated one from the other and move as a whole. Therefore these may not be used as a passenger urban train U.S. Pat. No. 3,730,103 (G. Neaver) reveals a convertible rail-highway vehicle, which is comprised by a relatively big monorail type vehicle, which may only travel horizontally or on slight slopes but by no means vertically. The document describes a hybrid type of rolling means. When the vehicle is standing still and when it moves slowly, it rolls on automobile type wheels. When the vehicle reaches and exceeds a speed of 100 mph, it retrieves the mentioned wheels and rolls on railway type wheels. The vehicle achieves lateral equilibrium thanks to the rotating momentum of the raised wheels which act as gyroscopes, rotating at 5000 rpm. The vehicle is also balanced thanks to roof elements that are activated by a pendulum and hydraulic means. The mentioned device is capable of running horizontally or on slight slopes but is not capable of running in vertical tracks, just as a conventional train or a bus when running under 100 mph. Although a pendulum is mentioned, the latter is only used for keeping lateral balance but does not allow to keep the vehicle's horizontal overall position. The driving mechanism of the mentioned patent is different from the present invention since it is not based on a combination of a pair of slipping-free guides with slipping-free wheels and does not guarantee equilibrium under all load conditions because its wheels do not increase pressure against the rail guides when the slope gets steeper, and therefore does not assure free of slippage rolling.

U.S. Pat. No. 3,987,734 (C. Horn) describes a closed loop system that allows a passenger car unit to be separately parked and picked up when fully occupied. However, the units may not travel vertically and therefore may not link several floors of a building or the latter with another premises. The units do not move about on guides or channels since they hang from a cable and do not form convoys that may replace a train.

U.S. Pat. No. 4,015,537 (H. Graef) discloses an indoors guided transportation system which rolls on two convex guides by means of 2 pairs of opposing wheels which are engaged to the former by the force of a set of compression springs. This teaches away from what is claimed in the present invention which does not use the springs for guaranteeing the adherence of the wheels to the guides and only uses them for keeping the wheels in place when these are not pressed by the force resulting from the cabin's combined weight. The anti-slippage friction of the wheels in the present invention is created by the momentum of the unit acting as a lever against the guides when riding on sloped or vertical portions of the runway but does not rely on the compression springs.

U.S. Pat. No. 3,922,970 (H. Glastra) describes an indoors guided transportation system which rolls on two cylindrical guides, one of which comprises a set of track elements formed by spaced pins extending towards the other and disposed in bends of the guide to ensure the vehicle's positive drive. The vehicle rolls on train type wheels and comprises a motor-driven driving wheel which contacts by friction one of the track elements and includes apertures formed in the outer circumference of the driving wheel which cooperate with the pins. Unlike the present invention, the vehicle bases its ability to run on horizontal, sloped or vertical tracks thanks to the engagement obtained by the pressure of a set of springs that push the wheels against the guides. Some of the springs keep a set of concave wheels pressed against convex guides and other springs keep a motor driven concave wheel against the convex guide. The invention of the U.S. patent is directed to small load transport and may not be applied to public transport vehicles because it is designed for handling small weights and is not capable of carrying people, particularly in vertical and sloped tracks, because the springs cannot guarantee that the friction between the wheels and the rails will be big enough to avoid slippage. Furthermore, the pins described in the U.S. patent would immediately wear out or even brake under heavy load acceleration or sudden stop.

U.S. Pat. No. 4,503,778 (F. Wilson) describes a transportation system which is based on a monorail wherein the transportation units have no own motor drive and may not work on vertical guides. The units are linked together in a large conveyor chain. The units hang from a beam and are urged against it by two automobile type wheels which roll over a metallic strip under each unit. The U.S. patent does not explain how passengers are able to step off the units or if all the chain stops in order to do this. Therefore the mentioned patent lacks of the basic features for solving public transportation.

U.S. Pat. No. 4,671,186 (J. K. Kunczynski) reveals a driver assembly for an automatic rail-based transportation system, based on a closed circuit monorail, with the passenger cars equally separated among each other and moved as a whole by friction on automobile type wheels. The documents solves sloped movement by means of a gear. The vehicles are laterally engaged and keep their lateral balance thanks to a lateral rail. However, the units are not autonomous since all the chain is driven by one or more central engines and may only be used in low speed applications such as shoppings, airports, etc.

U.S. Pat. No. 4,693,186 (A. Lisa) discloses a funicular with rails and a hanging car cabin which rolls on the rail driven by a cable. It may run on horizontal and sloped tracks and keeps the cabin horizontal, within a small angle range, thanks to a hydraulic leveling system. However the system seems to be unable to run on vertical tracks, it may not handle autonomous car cabins and, unlike the present invention, is driven by cables.

U.S. Pat. No. 5,058,508 (S. M. Kavieff) describes a conveyor system with cantilever carriers, designed for hauling automobiles in a factory production chain. The system is based on a monorail and does not mention autonomous conveyor units.

U.S. Pat. No. 5,289,778 (R. A. Romine) describes an automated electric transportation system which includes a transport automobile or travel "van" with two upper support means, normal car wheels and train wheels mounted in inner positions related to the former ones. The mentioned elements may allow the "van" to run on normal roads, on railways, or to be hauled on hanging systems. The vehicle works on electricity and includes recharging means. However, the mentioned patent does not describe a multiple autonomous car system that may run on horizontal, sloped or vertical guides and replace conventional public transportation.

SUMMARY OF THE INVENTION

Accordingly, it is one object of the present invention to provide an autonomous transport system which is capable of overcoming the transport handicaps shown in prior art devices, being able to run on horizontal, highly sloped and vertical tracks with no speed degrading and capable of keeping a plurality of vehicle units in autonomous movement and individual full stop, with guaranteed non-slipping action on any of the mentioned tracks.

It is another object of the present invention to provide a vehicle that is able to run on horizontal, highly sloped or vertical without risk of slipping and with absolute security for the people and goods transported in it.

It is a further object of the present invention to provide a transportation method for people and goods, carried out by the autonomous transport system of the present invention, and particularly for solving densely populated city transportation.

To achieve the foregoing objects and in accordance with a purpose of the present invention as embodied and broadly described herein, the system and transport method will now be fully described.

BRIEF DESCRIPTION OF THE DRAWINGS

In all the following schematic figures, the same elements are indicated with the same reference number.

FIG. 16 is a top view a transference center.

FIG. 21 shows a table of average data, a graph of speed as a function of distance and graph of time as a function of distance for the A.T.S.

BRIEF DESCRIPTION OF THE PREFERRED EMBODIMENT

The Autonomous Transport System (A.T.S) of the present invention is formed by four main sub-systems:
A) Channel Sub-system (CSS)

Figure 1:
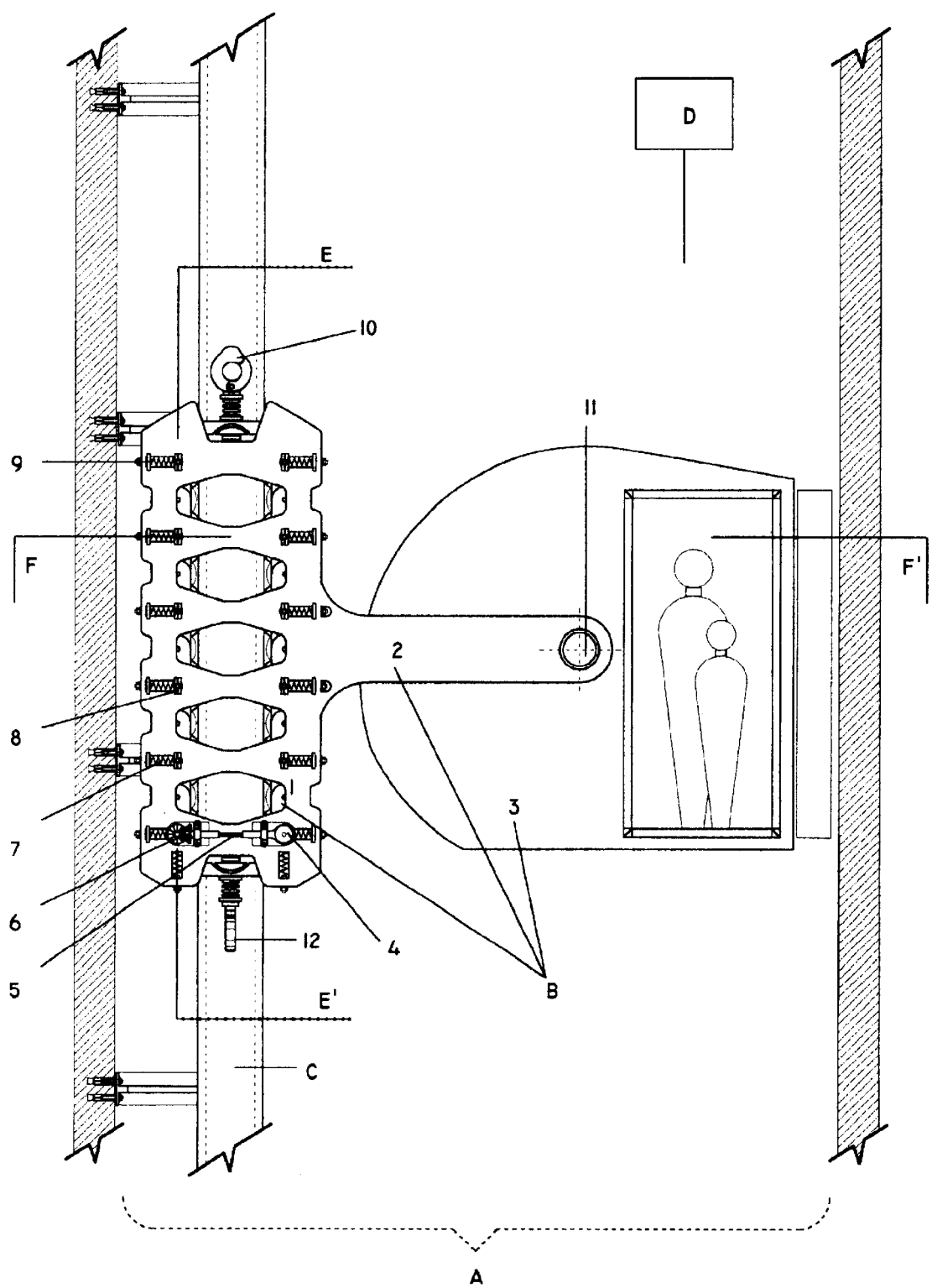
FIG. 1 is a side view of the channel, showing the wheel guides and the vehicle of the present invention.
Figure 1A:
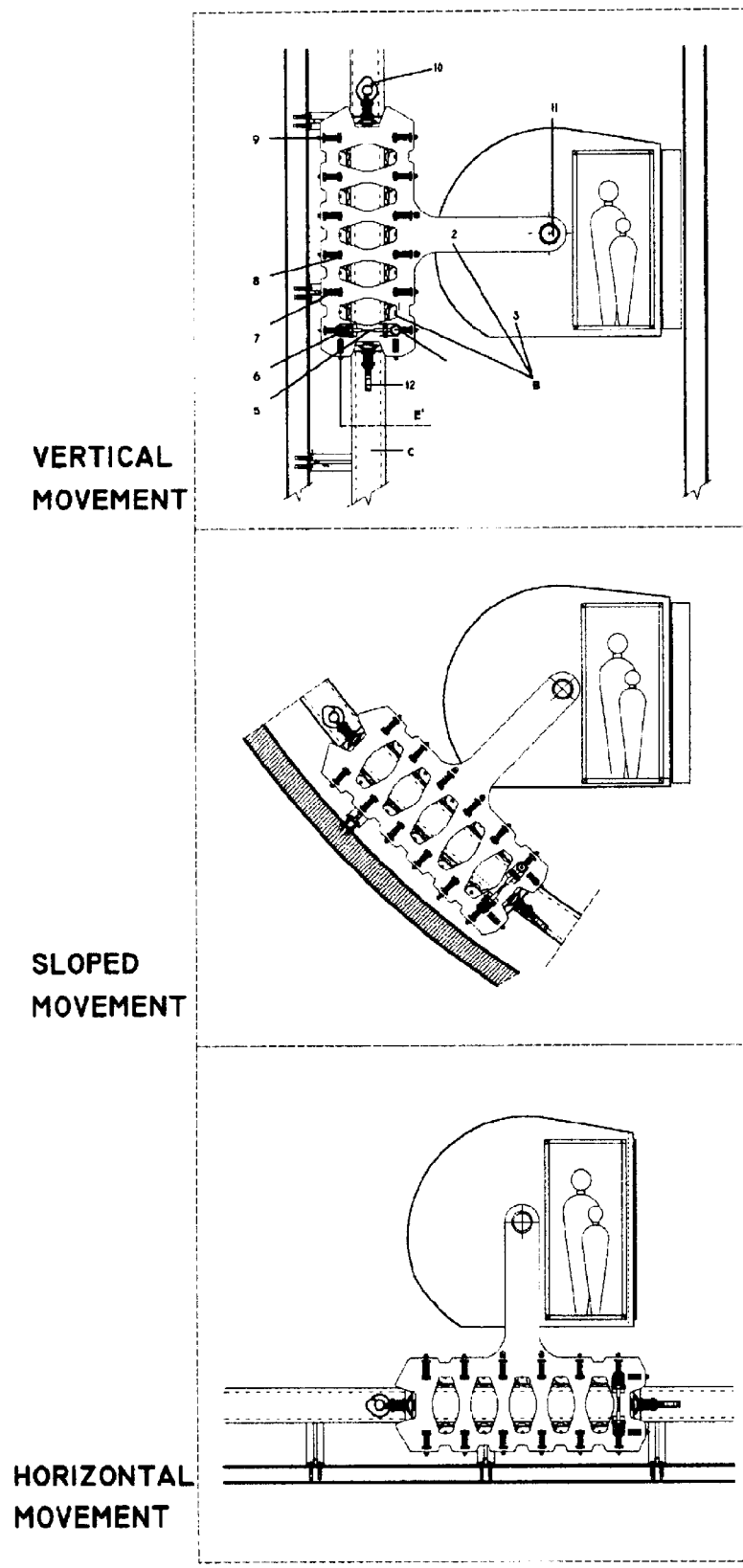
FIG. 1A is an enlarged detailed view of the driving wheel assembly of FIG. 1.

In FIG. 1, reference A shows the space or channel through which the transport unit may move. This channel can be interior or exterior to a particular premise, depending on its use and location. It will be defined as being interior when located inside of a building, in constructions or urban settlements or in underground sites, and exterior, when the wheel guides and the vehicle are to be located in an open space, outdoors.

B) Vehicle Sub-system (VSS)

In FIG. 1, reference B shows the elements which form the vehicle unit. The unit is powered by electric energy and moves on wheel guides, in any direction: vertical, horizontal or slanted, regardless of the slope; in either direction. The overall runway is controlled from the Central Control Station and the desired stops may be controlled by pre-programmed schedules or else may be selected by the passengers from the vehicle's inside.

C) Wheel guide subsystem (WGS)

In FIG. 1, reference C shows the wheel guides that will define the direction, itinerary and stops of the vehicles. In FIG. 4A, different bypass embodiments with bypass switching tracks may be seen.

D) Central Control Station Subsystem (CCSS)

In FIG. 1, reference D, shown only schematically, is in charge of controlling and supervising the other systems. For example, the Central Control Station may program the route of the vehicles within intervals on a same track, the wheel tracks being horizontal, vertical or sloped, and making route changes by track switching. The CCSS may add or withdraw vehicles from the different routes; being able to program the bypass of one or more vehicles in any direction. The CCSS is also in charge of controlling the security systems such as fire barriers, emergency stops and so on.

DETAILED DESCRIPTION OF THE INVENTION

A) The Channel Subsystem

Figure 3:
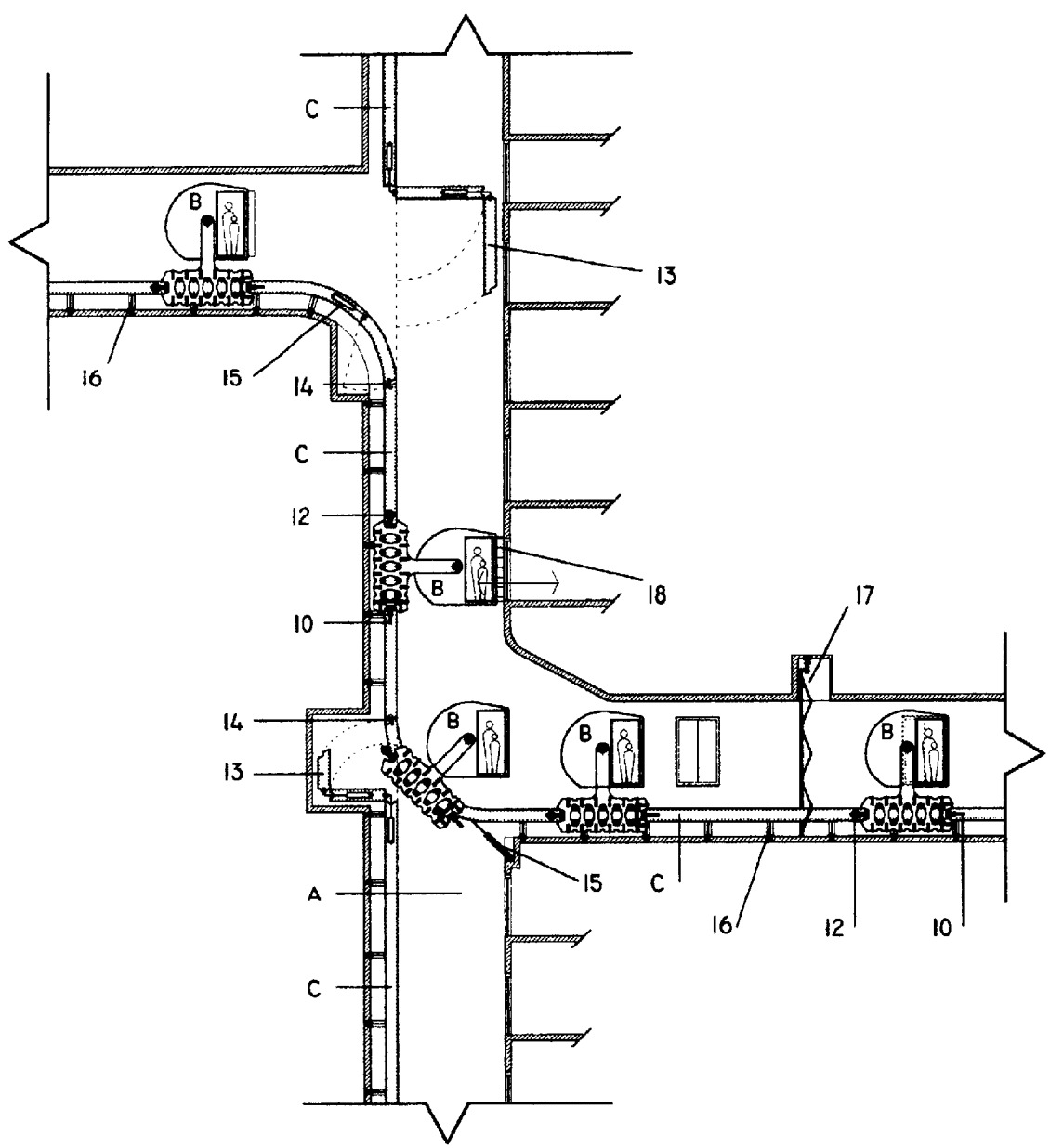
FIG. 3 is a side view of the channel, in a portion where different sections of different routes meet, showing their correspondent switching tracks and also showing strategic locations of the fire-barriers in open and closed position.
Figure 4:
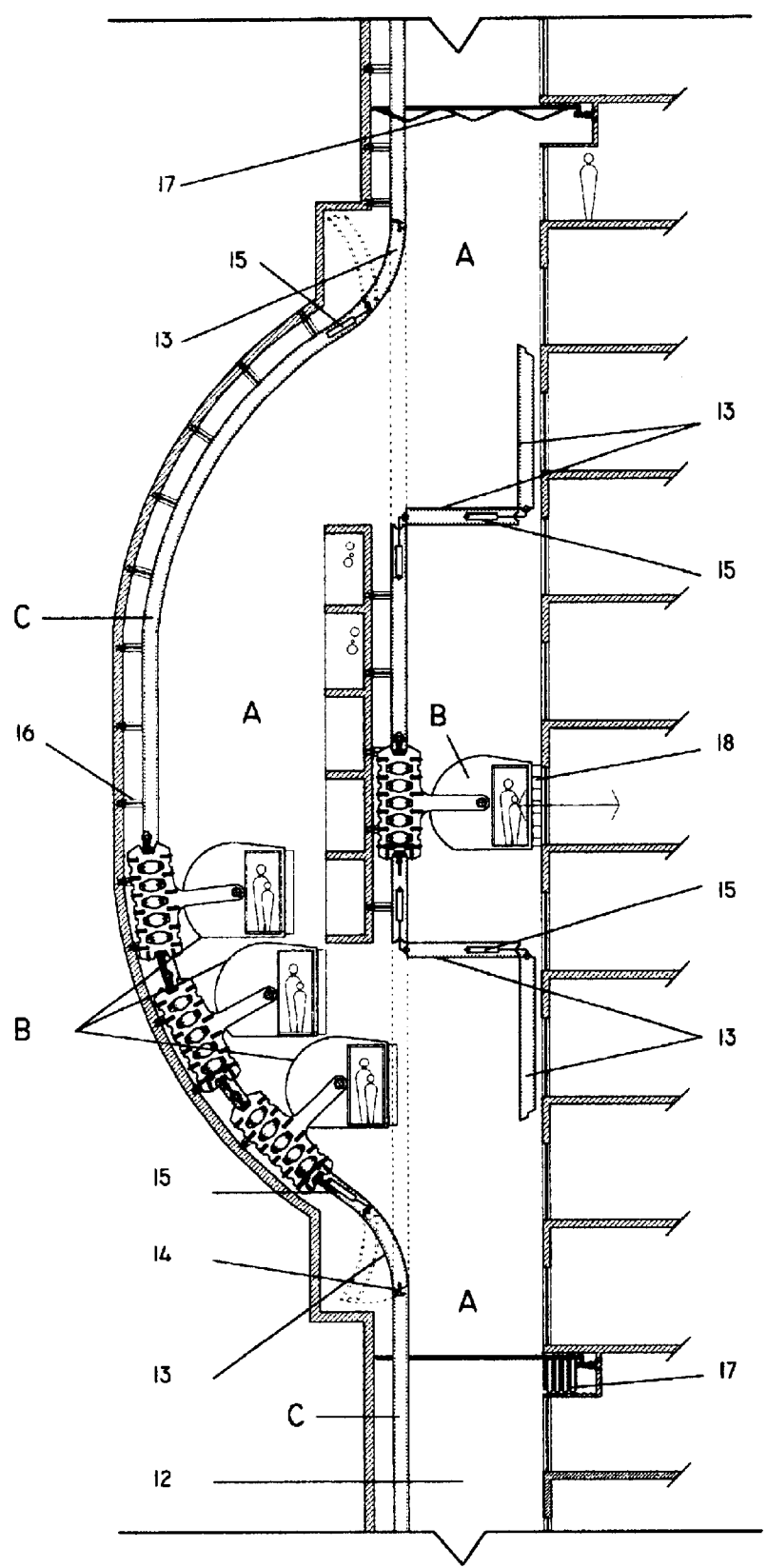
FIG. 4 is a side view of the channel and a parallel bypass secondary channel with a detour for allowing unit stop, also showing fire-barriers shutting down channel sections.
Figure 4A:
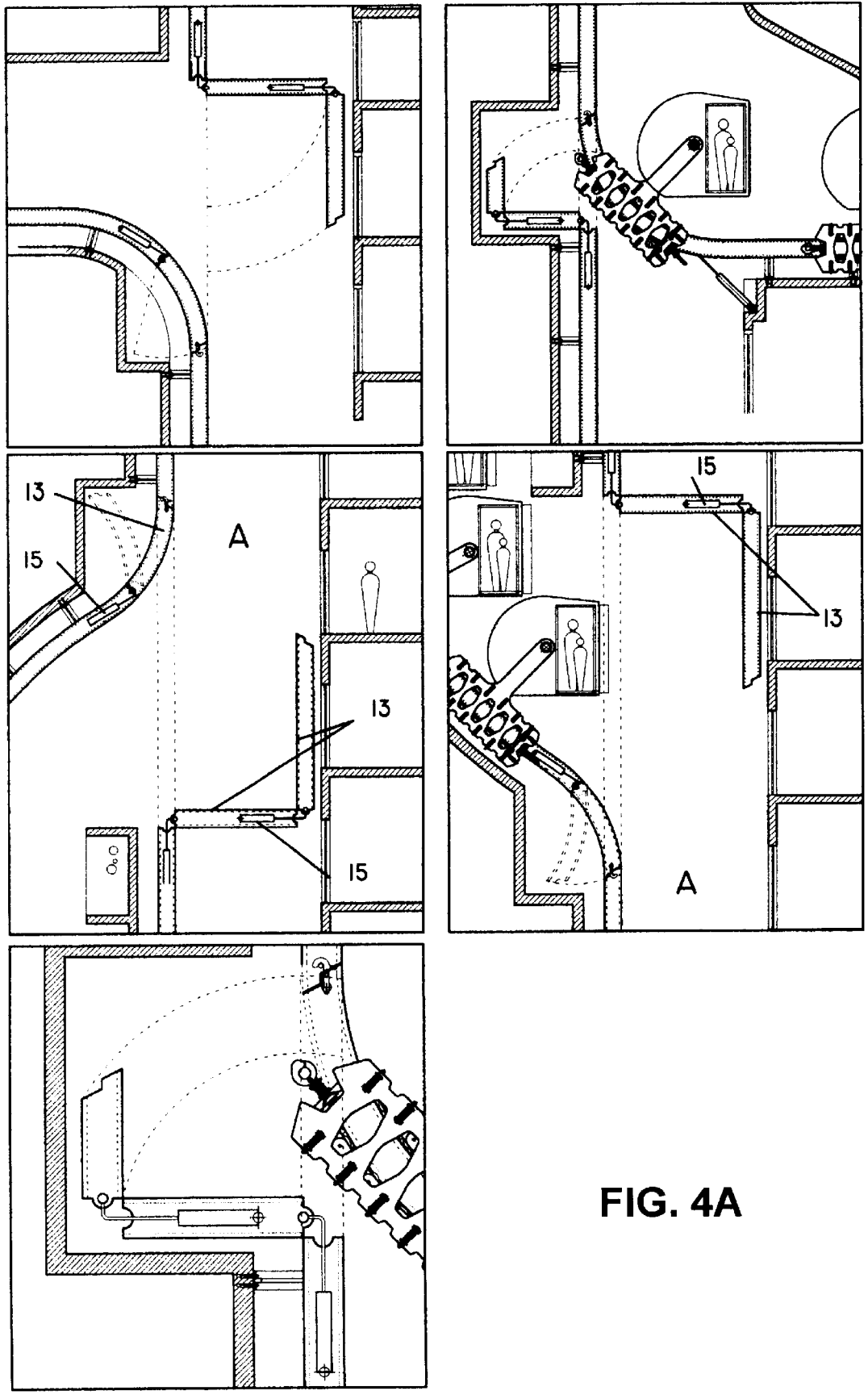
FIG. 4A is a schematic side view of several embodiments of switching tracks.

The Channel Subsystem (CSS) is formed by:
a-1) Main route/channel subsystem
a-2) Secondary routes/channel subsystem
a-3) Openings subsystem
a-4) Security subsystem FIGS. 3 and 4 show the space through which the autonomous transport system runs. The figures show that the channel A includes the wheel guides attached to the channel walls by means of structural attachment elements 16 and comprise switching tracks 13 and hydraulic pistons 15, for route changing and bypass features. The wheel guides also include security hooks 14 to mechanically avoid security failures. The FIGS. 3 and 4 also show the position of fire barriers 17 which respond to NFPA (National Fire Protection Association) coding and gangways 18 or security cabin bellows which seal the cabin respect of the outer environment.

a-1) Main channel Subsystem

This subsystem is the path that the different circuits or routes may follow between the different stops or terminals. In the case of a channel inside a building, it consists of a structural tube, to which the wheel guides 16 are attached, and to which the secondary channels and the ventilation pipes converge. Its dimensions are big enough to allow the displacement of the vehicle/s or the convoy (group/series of vehicles). An alternative embodiment foresees creating a set of various main channels, one beside the other. This is accomplished with the same described subsystems and with independently programmed route sequences.

a-2) Secondary Channels and Static-resting spaces Subsystem

These are complementary spaces used for services, secondary functions such as: over passing of vehicles, resting, as reserve, parking of vehicles for maintenance, emergency, loading (people or goods), etc. The Static-resting spaces are those where the switching tracks are used to change wheel guides, were the engine assembly of the fire barrier is located, and so on.

a-3) Openings Subsystem

These are openings that are included in the channels and have different functions. For instance, they may be apertures through which the passengers enter or exit the system on each stop. They may also be emergency entrances or exits or maintenance accesses for vehicles, wheel guides, attaching elements for the wheel guides, switching tracks, energy vaults, conductors, pipes, sequences controlling-elements, fire-barriers, ventilation pipes, etc.

Security subsystem

FIGS. 12, 12a, 12b, 12c and 13 show detailed side views of the security elements. Since the vehicle system of the present invention requires no cables or mobile elements, it allows to create a convenient design for the fire barriers 17, which are installed in the channels.

The use of fire barriers is well known in the art and may be precisely designed by means of the NFPA guidelines. The fire barriers, also called fire walls or fire dampers, are used to avoid the chimney-effect on high buildings, which is proportional to their height. The barriers are to be installed in strategic locations. This will allow to stop the expansion/ spreading of the fire's action and provide preferential positions from were it may be controlled. Its setup follows a strict functional sequence. The subsystem works with a 12 v battery in each barrier, which guarantees that it will work when normal electrical supply is interrupted. They are formed by metal plates 55, so as to keep its stiffness when working. Each plate is made up of three elements; two hinges 59, with a locking pin that articulates them with the ones next to these, and another plate made of a fire proof material 60 that protects the side that is to be exposed to fire. The continuous hinge, crossed by an axle 56 from side to side, works in it's ends as a support for the sliding ball bearings. These ball bearings run through two rails 54, one on each side of the rails, and also contain a steel circulator cable 58, which extends or folds the barrier by pulling. Power is supplied to a 12 volts electric DC reduction motor 57, powered by the electric batteries. The fire dampers may be automatically commanded when a fire alarm is detected by a smoke, temperature or fuse automatic detector, or else they may be manually activated from the Central Control Station, if the former automatic security elements fail, or if the firemen decide to do so. In the last plate of the damper, beyond the wheel guides, there is a reinforcement 61 so as to maintain the damper stiffness and for allowing an aperture for the wheel guide to pass through it. Finally, the barrier has an adjustment piece 62 for ending the barrier at the side facing the channel.

B) The Vehicle System

Figure 6:
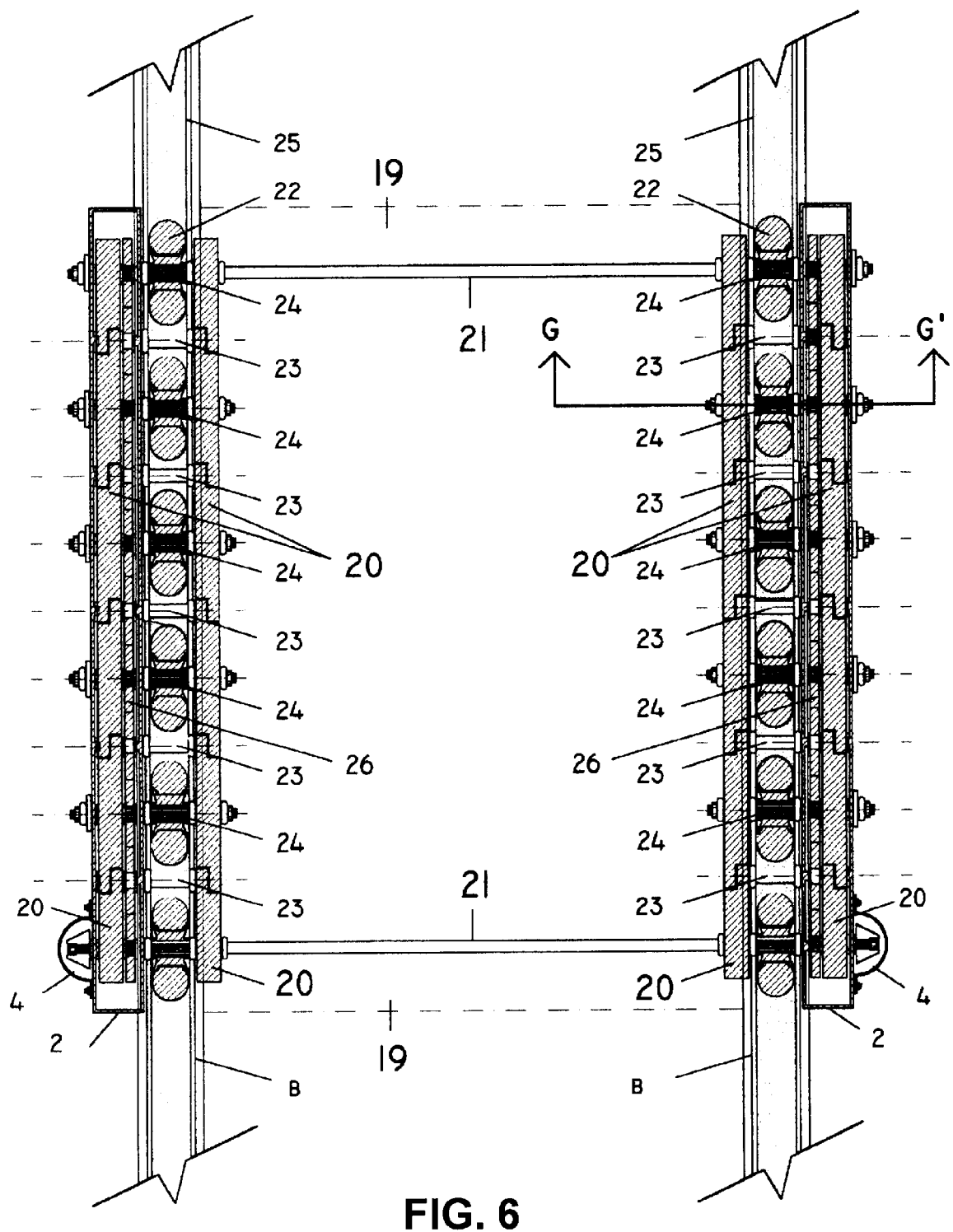
FIG. 6 is a cross sectional front view of the traction assembly and cantilevers shown in FIG. 5.
Figure 9:
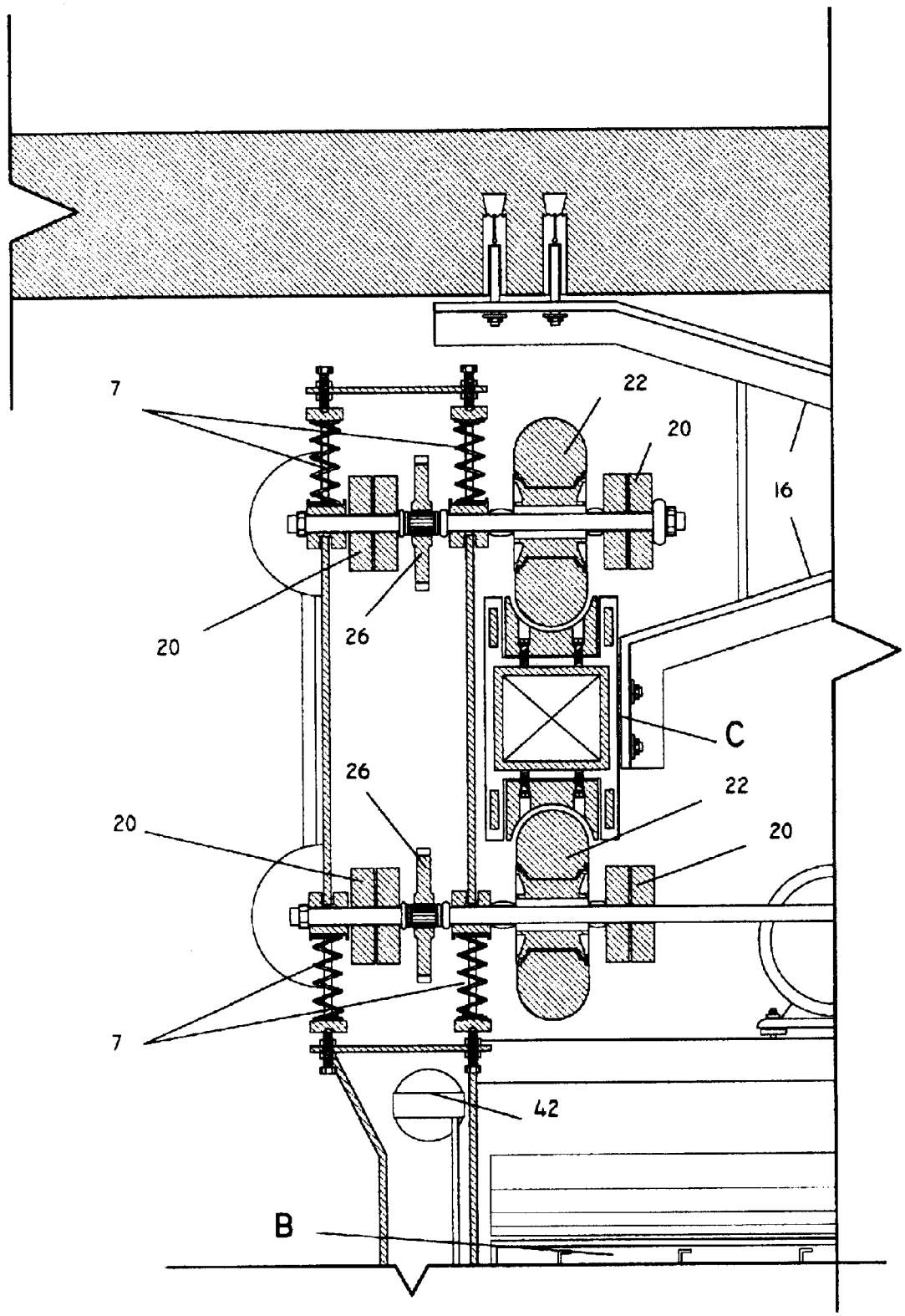
FIG. 9 is a cross sectional view of the traction assembly.
Figure 10:
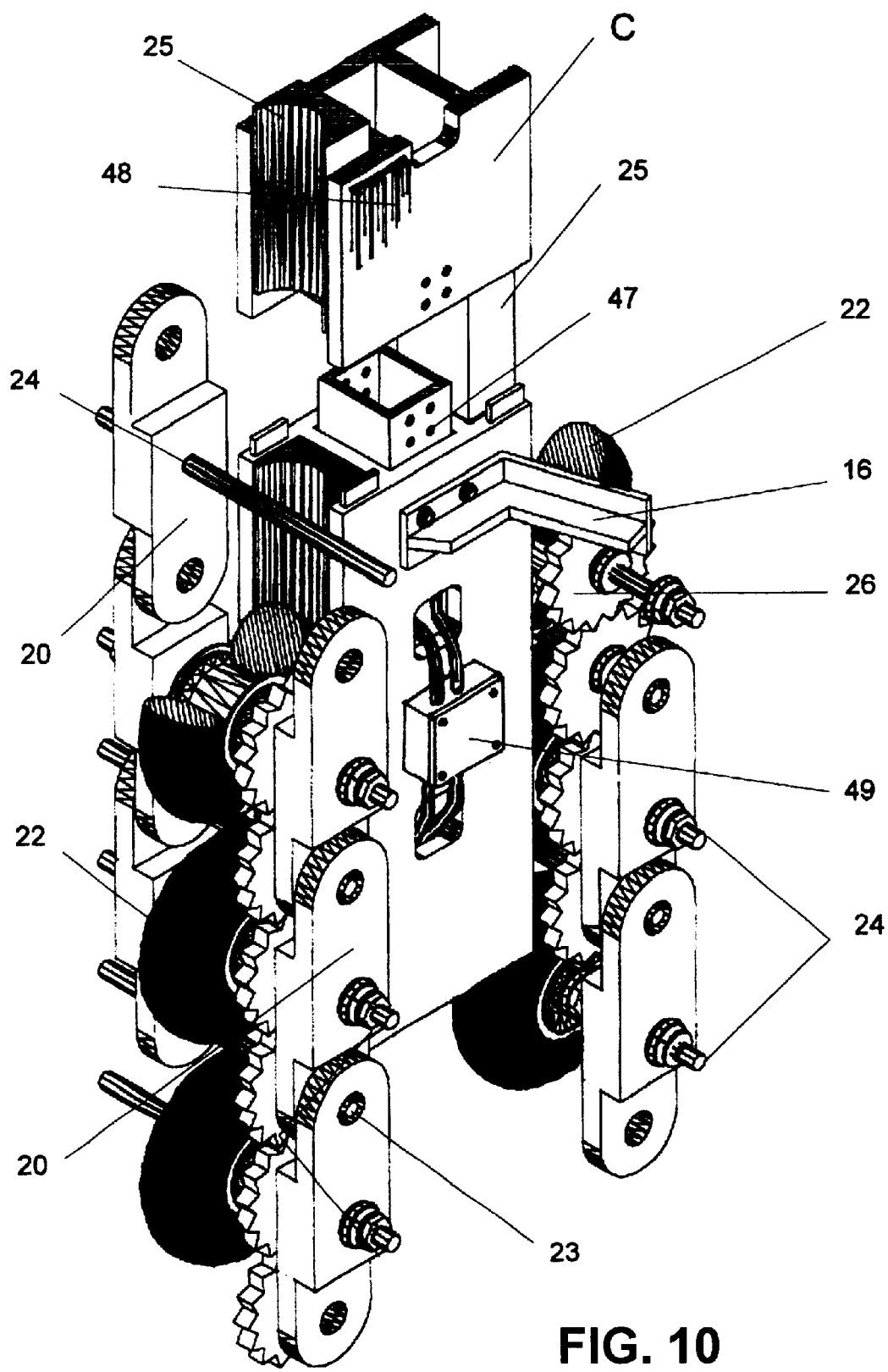
FIG. 10 is a perspective view of the traction assembly.

The vehicle subsystem is formed by five subsystems:
 b-1) Traction assembly
 b-2) Cantilever 2
 b-3) Cabin
 b-4) Engine assembly
 b-5) Security system Traction assembly FIGS. 1, 6 and 10 show that the traction assembly of the present invention is formed in a preferred embodiment by two sets of preferably five wheels each. FIG. 10 shows that each one of these wheels rolls on their correspondent wheel guide C, each set divided into five or six pairs of opposed wheels, that hold on to the wheel guide as a result of torque created by the weight of the vehicle and its contents, applied on the hinge 11 and the pressure of the compression springs 7 (FIG. 1). In the vehicle's position shown in FIG. 1, the left side vertical set of wheels (further away from the cabin) will be arbitrarily called "front" wheels and the right vertical subset (nearer to the cabin) will be called "rear" wheels. The wheels 22 are supported on a light alloy material and are covered with a solid rubber tire, preferably of semicircular cross section that defines its external surface, and roll on a semicircular and concave track 25. In alternative embodiments other tire profiles may be chosen, such as parabolic or semi-elliptical ones, in order to better match with the profile of the corresponding wheel guide and thus obtaining a greater contact surface to increase friction coefficients. The wheels are attached by means of grooved axles 24 and gears 26 (also shown in FIG. 9). These connect all the wheels 22, the front wheels are joined together and the rear wheels are also linked together, so that all work and brake as a whole. All these wheels 22 are joined to an articulated sub chassis 20, by the axles 24 that pass through, from one side to the other of the assembly. There are two types of axles 23 y 24. The fluting or grooved axles 24 join the wheels and gears to the sub chassis 20, and the latter to the main chassis. The axles 23 have smooth surfaces and allow for the rotation of articulated gears and for the rotation of the turning corrector. The turning corrector provides for the articulation of the sub chassis 20 between two wheels 22 and acts as a support for the connecting coupling gear, between each one of the wheel's gear 26. The turning corrector not only allows for the simultaneous rotation of the wheels but it also allows the rotation of the articulation of the sub chassis 20. The axle 24 has a double function. The first function is to attach the wheels 22 to the articulated sub chassis 20, and the second one for attaching the sub chassis 20 to the cantilever 2. The axles are fixed to the cantilever by sliding elements 8 (FIG. 1), retained by the compression springs 7. This allows for the displacement of the axles 24 as the articulated sub chassis 20 moves on curves or any other kind of changes in the guide path. This results in a change in the distance between the axles 23, 24 and in a change of their position, compressing vertically and horizontally the springs 7 of the cantilever 2 in the middle of it or at its ends. The front set of wheels is connected to the rear ones by a pair of conic pinions 6 and a differential mechanism 4, joined by a sliding fluting axle 5 that absorbs the displacement of the front set of wheels respect to the rear ones. In a perfectly horizontal runway, the wheels that engage the wheel track from underneath will not receive any pressing force due to the cabin's combined weight and therefore these will be kept in contact with the wheel track by means of the compression springs 7. When the vehicle gets into a sloped runway the wheels will receive pressure forces, perpendicular to the track and forces parallel to the track that try to urge the vehicle to slide down the slope. The fact that the center of gravity of the cabin is distant form the wheel plane allows for a higher torque that increases the resulting pressing forces, particularly at the wheels that are near both ends and on one of the two opposing faces of the assembly.

A simplified static force calculation may verify the principle of the invention, allowing to demonstrate that the torque created by the cabin's overall weight presses the end wheels in such a way that these do not slip when running on a vertical track.

Assuming the wheel assembly has 3 pairs of wheels and the cabin is on a vertical track (FIG. 1):

Data

Weight of the cantilever ($W_{can}$)=1,200 Kg
Weight of the cabin ($W_{cab}$)=600 Kg
Transported Load ($W_L$)=1,200 Kg
Wheel assembly weight ($W_A$)=600 Kg.

Since the application force is totally vertical, the lateral forces due to the cabin's torque on the middle wheels is zero because these are on a horizontal plane containing the application force (ref. 11 in FIG. 1)

Distance from joint (ref 11 in FIG. 1) to center axis of wheel guide ($d_j$)=2.10 m Distance from each end wheel to the center of the wheels assembly ($d_w$) 0.70 m Static friction coefficient of wheels against track ($\mu$)=0.8

Calculations

Total weight=$W_{cab}$+$W_{can}$+$W_L$+$W_A$=1,200 Kg+600 Kg+1200 Kg+600 Kg=3,600 Kg The weight of the cantilever is applied at its center of gravity, i.e. approximately at $d_c$=$d_j$/2

For sake of clarity, the torque is calculated as a total force applied at the joint.

At the joint, the torque due to the cantilever's weight is $W_{can} \times d_c = W'_{can} \times d_j$ Therefore, the component of the force due to the cantilever's weight, applied at the joint is $$W'_{can} = W_{can} \times \frac{d_c}{d_j} = W_{can}\frac{d_j}{d_j}/2 = W_{can}/2 = \frac{1,200}{2}\text{Kg} = 600 \text{ Kg}$$

Total vertical force applied at the joint ($F_j$)=$W_{cab}$+$W'_{can}$+$W_L$=600 Kg+600 Kg+1,200=2,400 Kg Total torque applied at the joint=$F_j \times d_j$=2,400 Kg×2,10 m=5040 Kg-m Torque resulting on end wheel ($M_w$)=pressing force on wheels ($F_w$)×distance ($d_w$)

Therefore the force pressing on the wheels at one side is $$F_w = \frac{Torque\ (M_w)}{d_W} = \frac{5040 \text{ Kg-m}}{1.40 \text{ m}} = 3,600 \text{ Kg}$$

The total vertical force of 2,400 Kg applied at the joint is balanced with two equal modulus and opposite direction horizontal reaction forces, each of 3,600 Kg, applied on both end and opposite sided wheels of the traction assembly.

Frictional force on one wheel=$F_w \times \mu$=3,600 Kg×0.8=2,880 Kg

Total frictional forces (both sides)=2 ($F_w \times \mu$)=2,880×2=5,760 Kg>3,600 Kg Since the total frictional forces (5,760 Kg) are greater than the total weight (3,600 Kg), the vehicle will not slide downwards when stopped on a vertical track.

Although the friction coefficient for rubber is $\mu$=1.0, a frictional coefficient $\mu$=0.8 was assumed for keeping a security margin. Since this coefficient is a major factor in the overall design, the wheel tire profile is an important issue to be considered. In a preferred embodiment the tire profile is generally U shaped as most commercial car tires. However, in pursuit of a higher contacting surface another highly preferred embodiments may consider semicircular, parabolic or semi-elliptical tire profiles.

The previous paragraph has mentioned outward facing wheel tracks. However, in an alternative embodiment, these may be placed in such a way that they face inwardly. In this embodiment, the wheels are placed so that they engage the wheel track from the inside. This wheel/track engagement keeps all the force and torque principles unchanged and only requires dimensional changes in order to keep vehicle's balance. The guide track central portion also needs to be redesigned because it requires a different mechanical track support as it requires now to withstand wheel reaction forces that will tend to separate the tracks one from the other in outward directions instead of compressing them inwardly one against the other.

Cantilever or Main Chassis Subsystem

Figure 2:
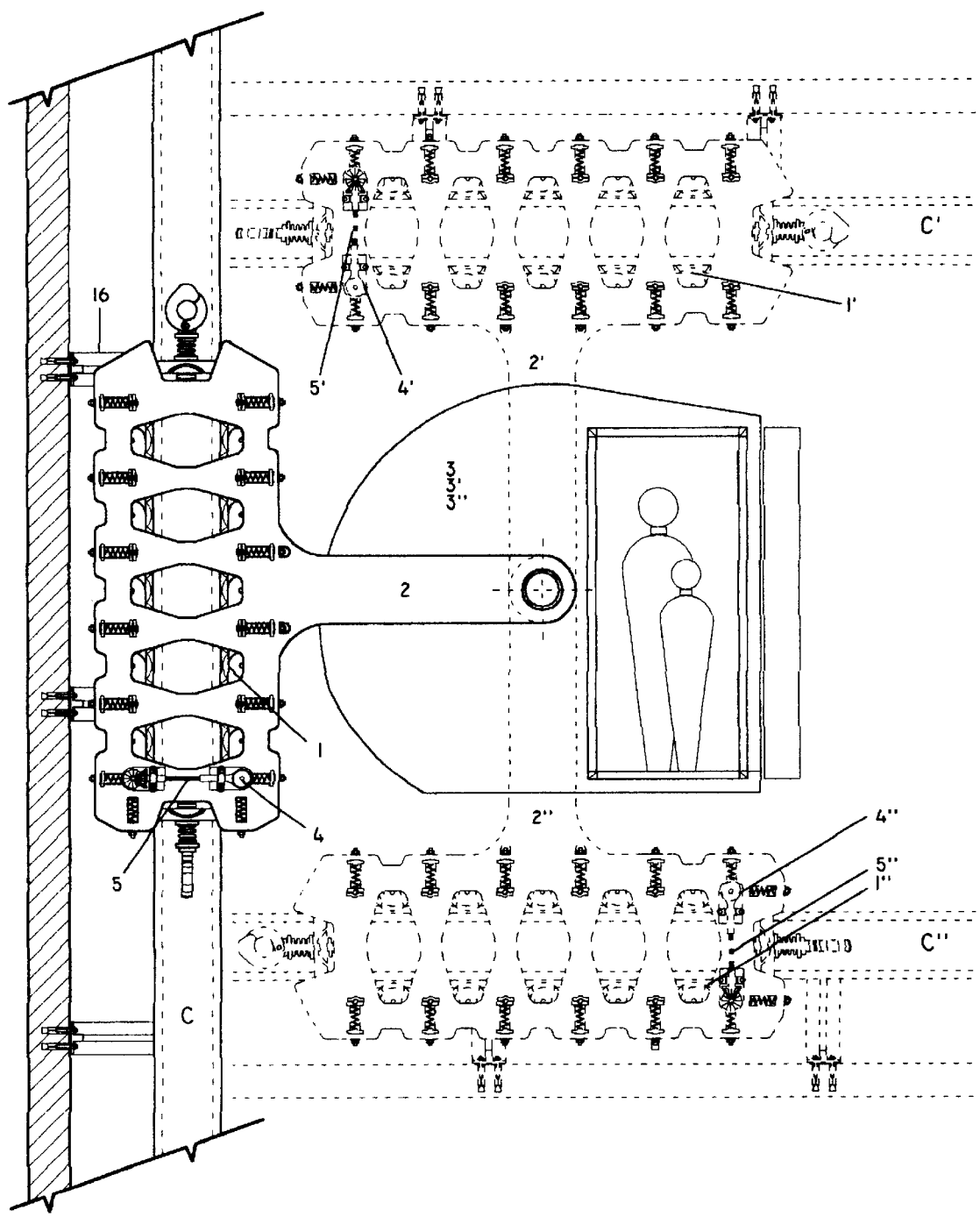
FIG. 2 is a side view of the vehicle with the supporting cantilevers on their extreme positions (vertical-horizontal) and the traction assembly over the wheel guides of the present invention.
Figure 8:
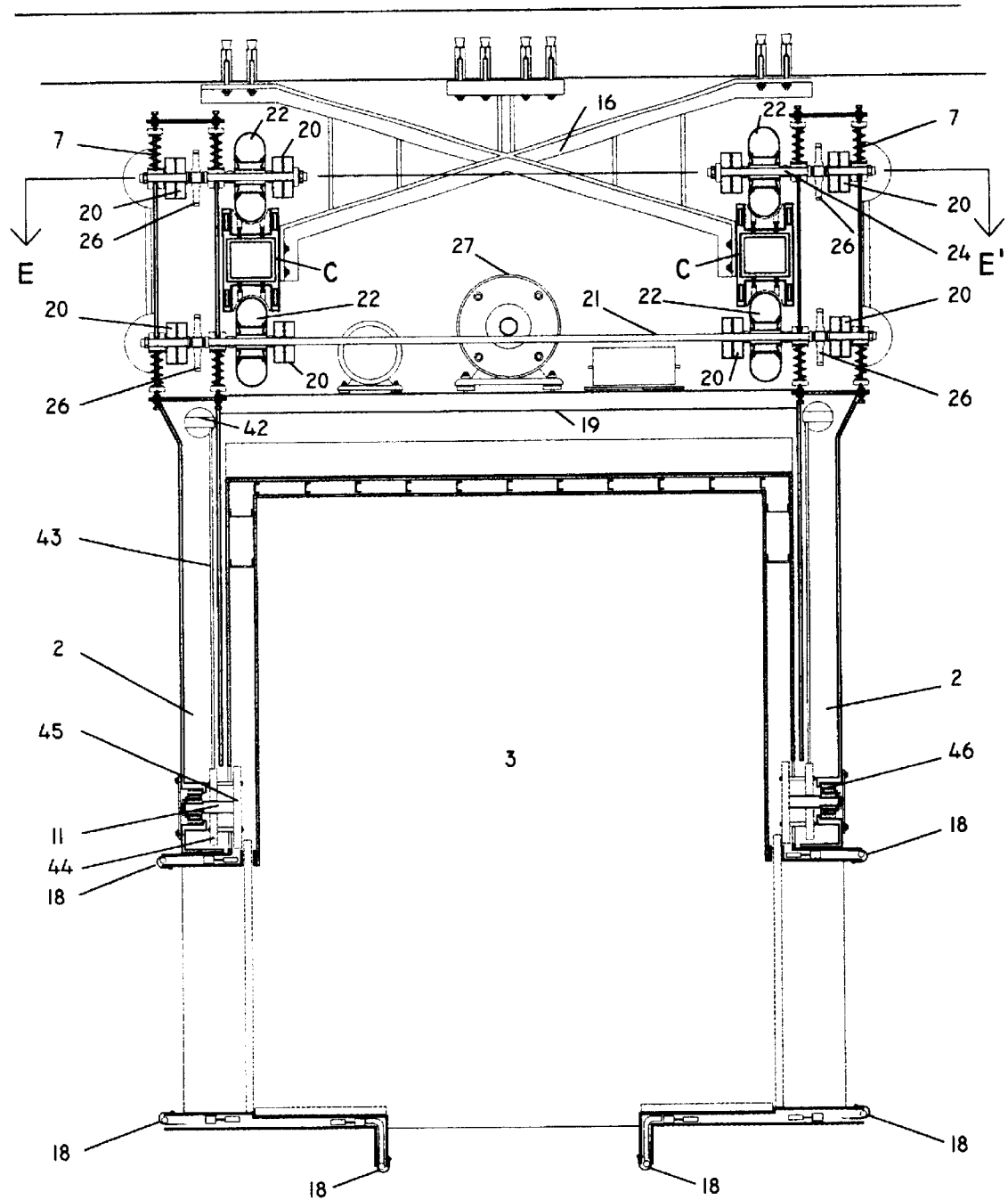
FIG. 8 is a cross sectional view through line F-F' of FIG. 1, showing the wheel guides, the engine assembly of the cabin, cantilevers, traction assembly, set of wheels and view of the supporting structure.
Figure 8A:
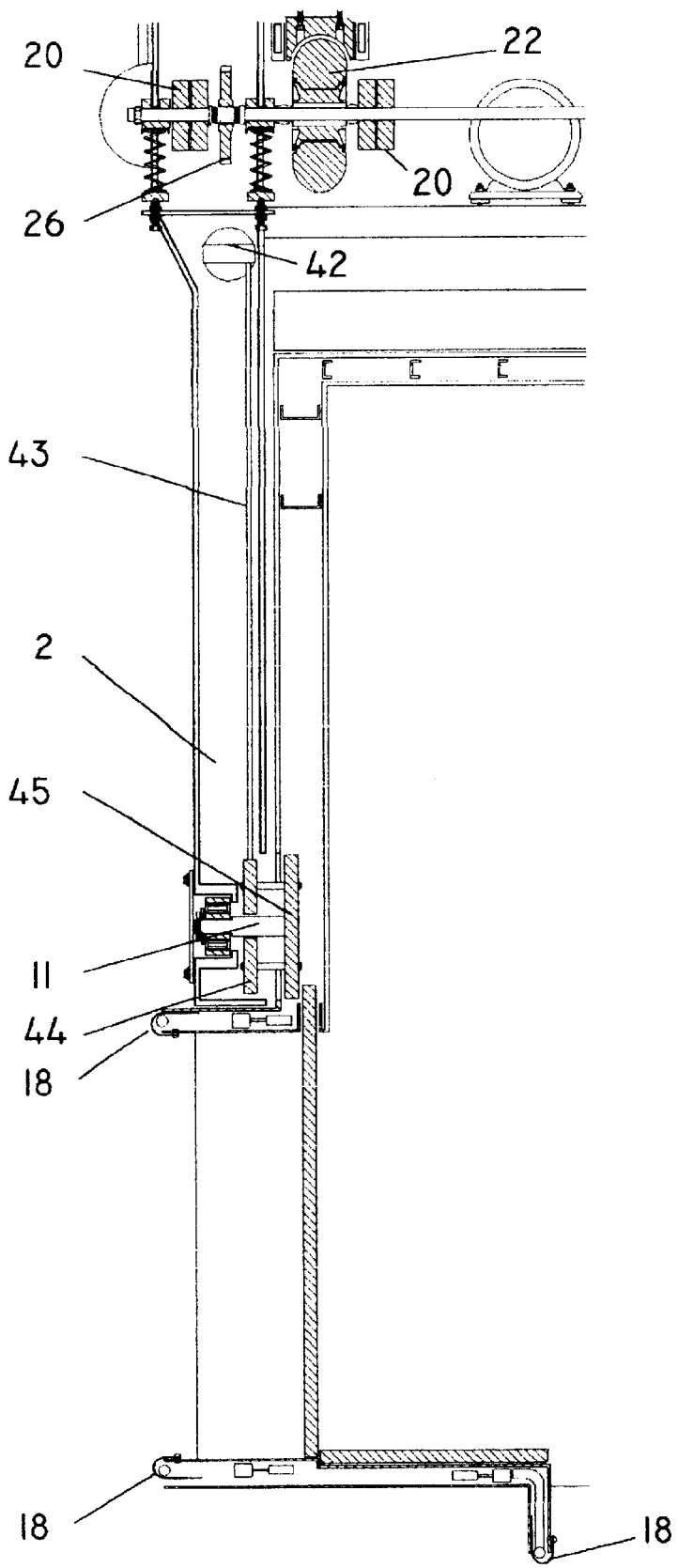
FIG. 8A is upper plan enlarged view of the leveling system
Figure 8B:
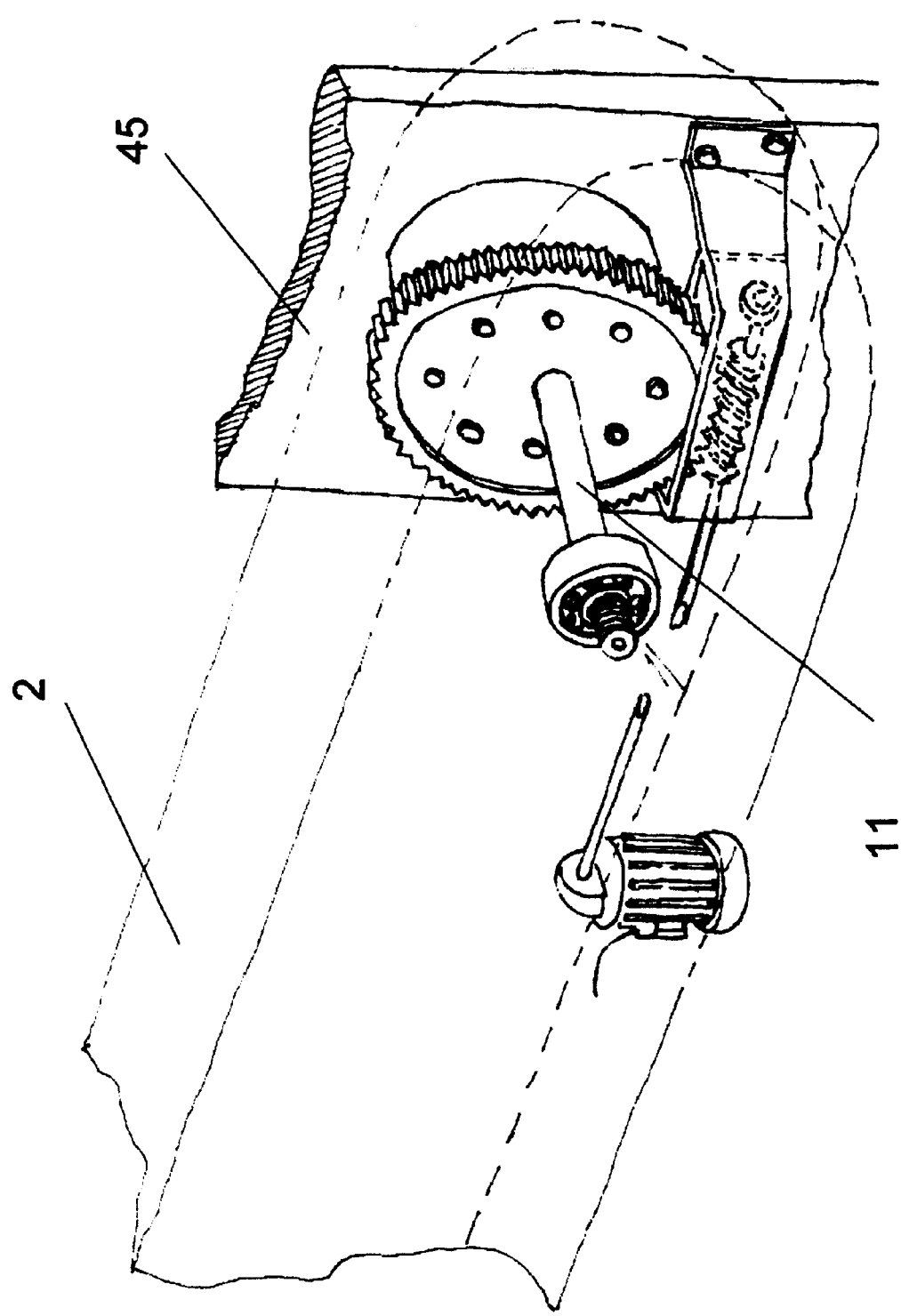
FIG. 8B is a side perspective partial view of the leveling system.

FIG. 1 shows a preferred embodiment of the cantilever 2, which is made of two hollow pieces, being comprised by two steel plates and with an internal structure that allows to fulfill it's function as a support. FIG. 1 shows that the cantilever 2 is engaged at one end to the rolling traction wheel assembly 1 and at the other end to the cabin 3, thus forming a lever structure with a force application point at the swivel joint 11. The net result of applying the cabin's weight at the point 11 results in a reaction force exerted on each subset of wheels against the wheel guide. In the position shown in FIG. 1, the upper wheel of the left subset will be pressed against the wheel guide with a maximum force directed to the right side, and the lower wheel of the right subset will also be pressed against the wheel guide but with a maximum force directed to the left. The other wheels will also be pressed against the wheel guide with forces that have smaller modulus and, in this particular case the wheels at the center will not be pressed at all. However, when the vehicle runs on tracks that are not vertical, the center wheels will also be pressed against the wheel guides. For all cases, i.e. vertical, slanted or horizontal tracks, the forces applied on the wheels will generate a friction force between these and the track that will allow the traction wheel assembly to roll on it without sliding. It is particularly important that the cabin does not slide when it comes to a complete stop on a vertical track and the frictional forces are calculated to comply with this case. Although a careful static forces analysis has shown that a smooth surface track may perfectly allow for the vehicle to run and stop on vertical tracks, frictional forces are enhanced by the special track profile which was designed for these purposes so that the wheels never slip and keep their rolling contact with it under worst load situation. As may be easily understood, when the track is perfectly horizontal, only the subset of wheels placed at the side of the cabin will be pressed against the wheel guides. In order to assure permanent contact of all the wheels, auxiliary springs are used to press the wheels against the wheel track. The cantilever 2 is positioned on both outer sides of the wheel guides C, and engages the sub chassis mounted on two subsets front and rear wheels. The cantilever 2 has, at one end, the sliding members 8 of the axles 24, made by two half H shaped sections members that grab the axle and which, at the same time slide through a spring guide. The springs 7 are stuck into the spring guides and are compressed by another member 9 which regulates each spring pressure by means of a screw. The cantilever 2 also supports the sub-chassis of the engine set 19 (see FIGS. 5, 6 and 8), located between the wheel guides C and on the vertical of the traction axle 21. FIG. 8 shows that, on both arms of the cantilevers, there is provided an electric motor reducer 42 that keeps the cabin 3 on a horizontal level position by means of axle 43 and a differential gear 44. This differential gear 44 coincides with the swivel joint 11 that joins the cabin 3 with the cantilever 2. FIG. 8 shows how the cantilevers 2 are articulated to the sub chassis of the cabin 45 and are allowed to rotate thanks to ball bearings 46, which are located at the ends of the cantilevers 2, being in this way, able to absorb the movements described as a consequence of the wheel guide's direction changes:

vertical, horizontal and sloped, and being capable of performing a 180° turn and, where space constraints are important, a whole turn of 360° turn may be carried out. This capability of turning 180° is shown with schematic dotted lines in FIG. 2.

In FIG. 1, the upper and lower hooks 10 and 12 are shown, which allow to create a convoy or train of vehicles by engaging these among each other. The hook 10 is mounted in a position that is 90° longitudinally rotated respect to the hook 12 and both are mounted on spring retained rods. These hooks allow for enough movement independence among the vehicles that form part of a convoy, particularly on curved tracks, so that they may travel together. Although not shown, in an alternative embodiment the hooks may be remotely motorized and controlled so that a single vehicle may be individually separated from the convoy in order to be bypassed to a maintenance detour track or for stopping in a previously selected exit gate.

Figure 11:
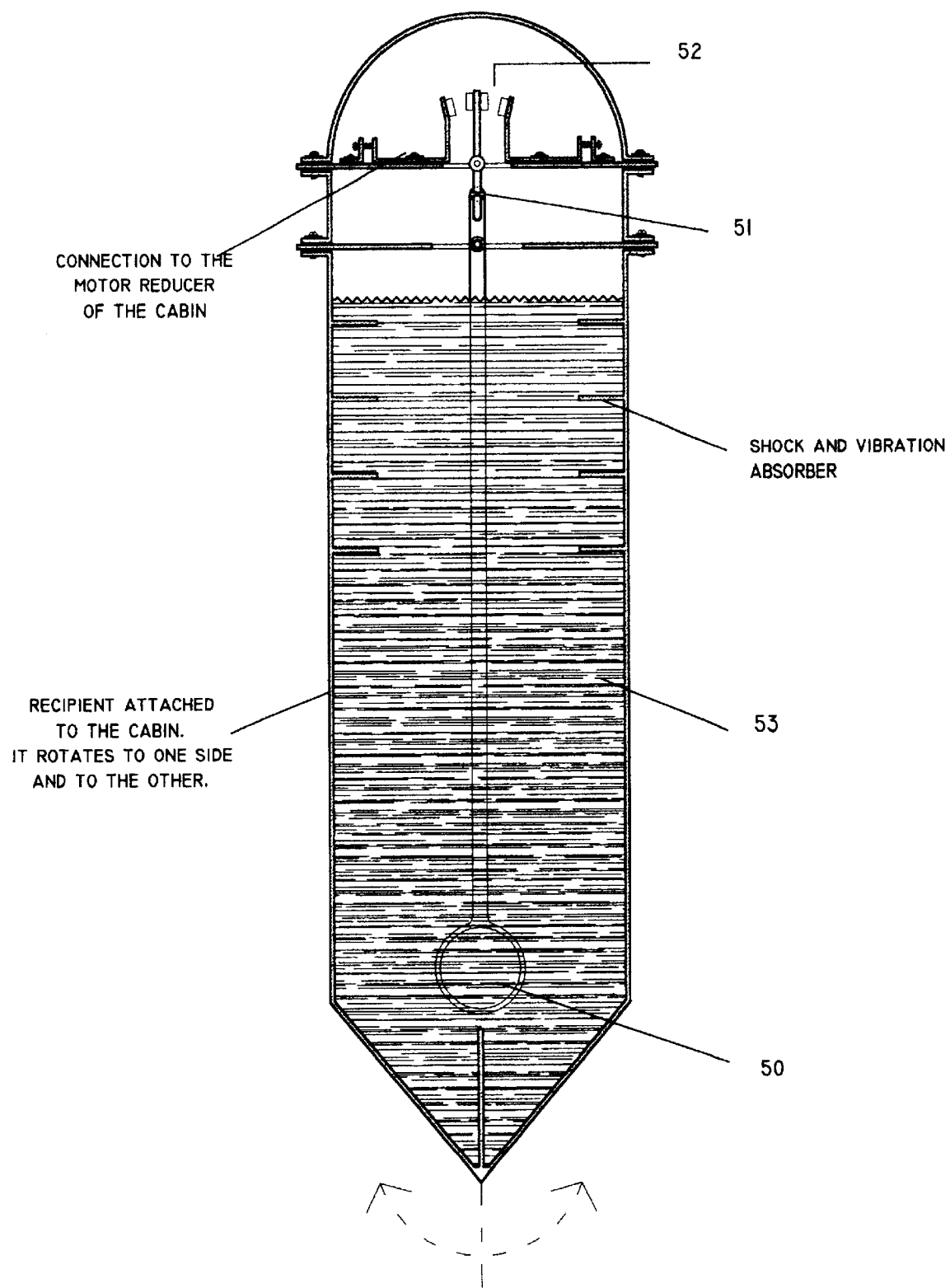
FIG. 11 is a schematic side view of the cabin's leveling system.
Figure 12A:
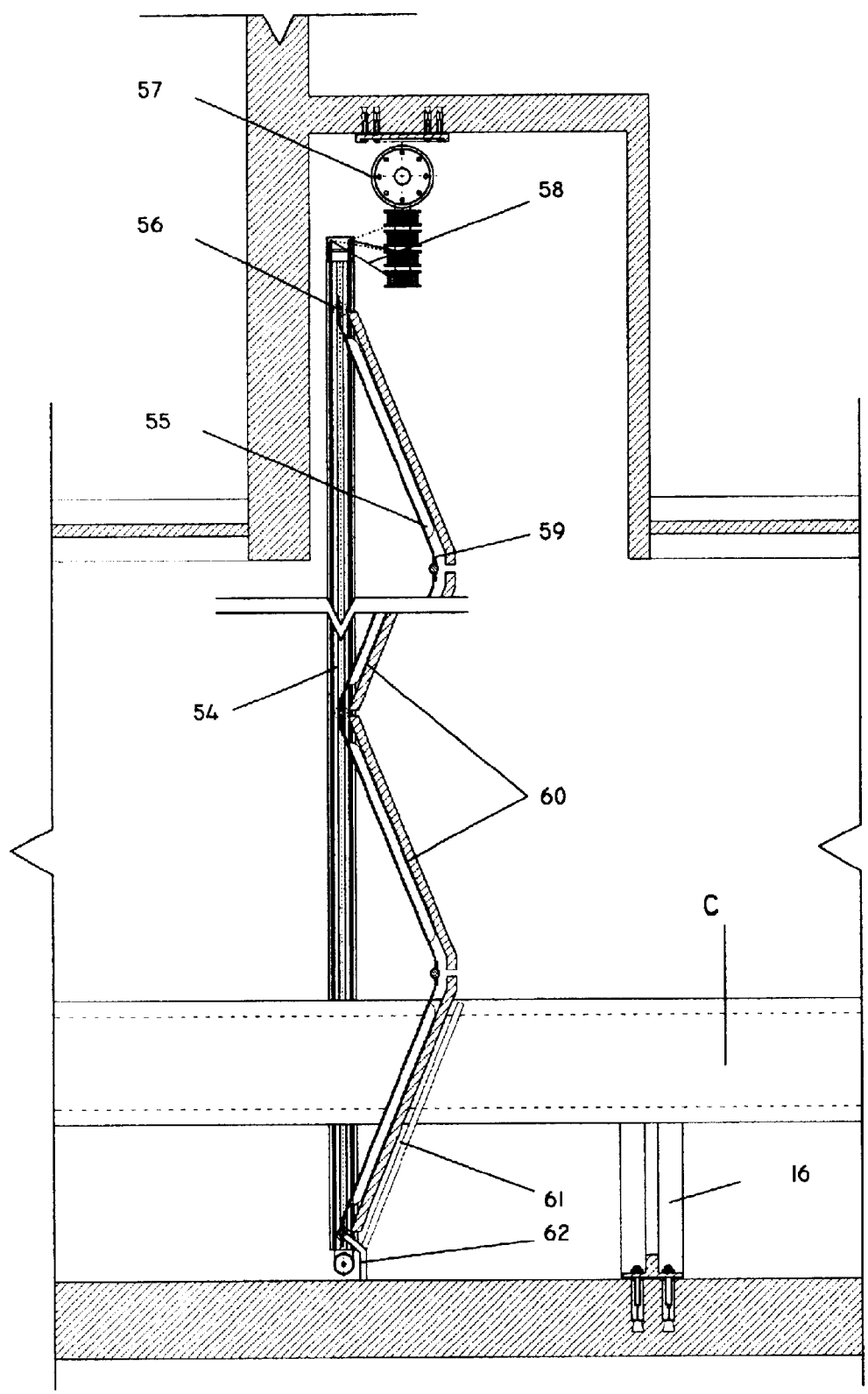
FIGS. 12a, 12b and 12c are enlarged side views of the fire-barriers shutting down a channel section.
Figure 12B:
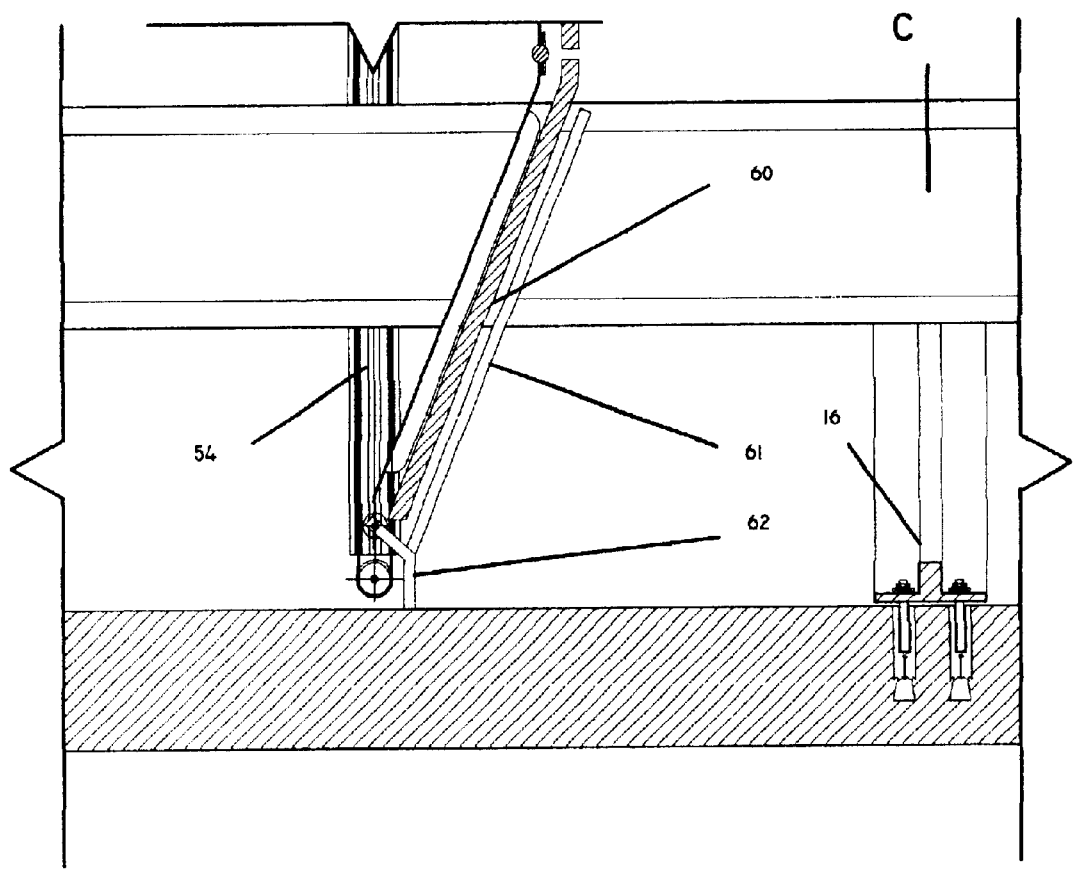
Figure 12C:
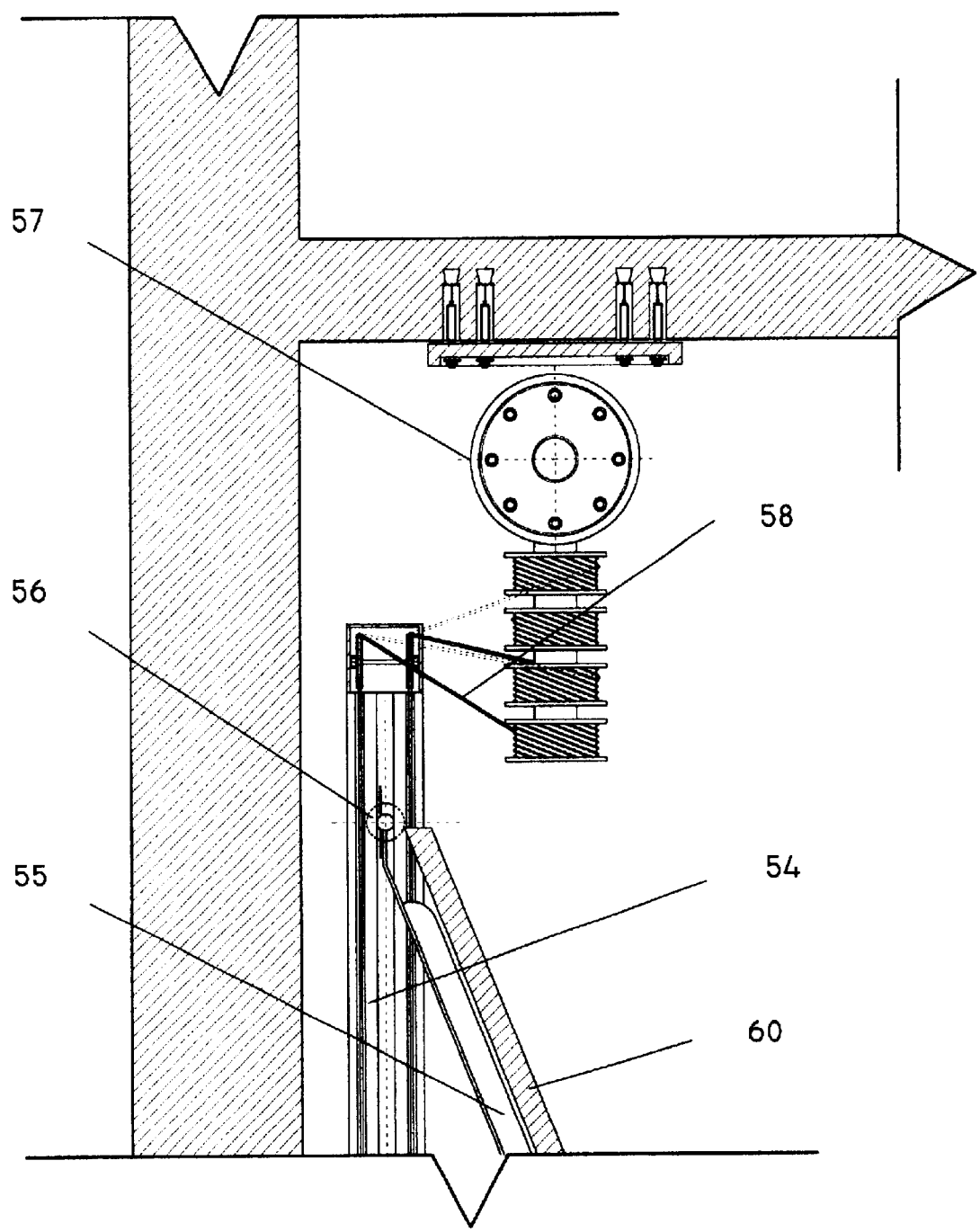

FIGS. 8 and 11 show an automatic leveling control for the cabin which enables the cantilever 2 to rotate 180° or, in special cases, if necessary even up to 360°, in relation to the cabin, keeping it in a totally leveled position for passenger comfort. Each vehicle works individually and independently even when attached to others in a convoy. As was said before its capability of being permanently leveled in a horizontal position is based on the use of a pair of axles or, in an alternate embodiment, on the use of a single axle. The cabin rotates right or left over the single axle or the pair of axles 43 when the electric motor reducer 42, being coupled with differential gears 44, is started. The gears 44 are exactly positioned on the axis of the swivel joint 11 of the sub chassis of the cabin. In particular places, where space constraints may require it, in an alternative embodiment the cabin may rotate with respect to the wheel assembly completing a full rotation of 360°.

FIG. 11 shows schematically the vertical level sensor of this system, comprised by a pendulum 50 that is located on the side of the cabin 3 and on the same geometrical axis as the swivel joint 11 of the cabin. The pendulum 50 acts as a 'plumb bob', determining the vertical position of the system. The pendulum is contained in a container 53 filled with glycerine, for movement dampening, and is articulated to a secondary lever element 51 that also articulates for amplifying the pendulum's angle. When the element 51 is moved by the pendulum, the micro switches 52 or contacts activate the electric motor reducer 42. The reducer 42 will then turn the cabin in the opposite sense or direction of the movement described until the pendulum 50 disconnects the system, once the cabin is leveled returning to vertical position. The movement multiplier 51 is engaged to the axle of the pendulum 50 at a side having a shorter lever arm. On the opposite side of the fulcrum the longer lever arm moves the adjustable contacts 52, that connect with the electric motor reducer 42 closing the mechanical circuit, and producing the rotation of the vehicle to left or right on each case. Both movement amplification levers are articulated allowing the variation in length. The container has moles inside in order to avoid the maximum movement of the liquid inside it. Glycerin was chosen as movement viscous damper in order to minimize viscosity changes with temperature. The system may include further shock and vibration absorbers (not shown). In an alternative embodiment, if faster and more precise level control is needed, the pendulum 50 may be replaced by any other leveling gyroscope based system.

Cabin subsystem

FIGS. 1 and 8 show the cabin subsystem, in which the people or goods may travel. The cabin may vary according to its use and whether it will be running indoors or outdoors. For transporting people, it may have a higher standard of comfort, with floor indicators, electronic message boards, message speakers, closed circuit TV sets, security video cameras, etc., all commanded from the Central Control Station D. These features are thought for informing or entertaining the passengers during their trip. The cabin, although not shown, may also have seats or stays for people to lay on during long journeys. It may include a device that will let the user choose final destination or intermediate stopping stations, and it may work together with the calling system of every terminal through the computer system, so as to improve the frequency of vehicles. Interior details of walls, floors and lighting will depend on its use. The structure will be set up on a sub chassis 45 with a U shaped section that is engaged by the support swivel joint 11 of the cantilevers 2. The cabin may have several accesses, for instance three of these, one at the front and one at each side, all of them with sliding doors.

Engine subsystem

Figure 7:
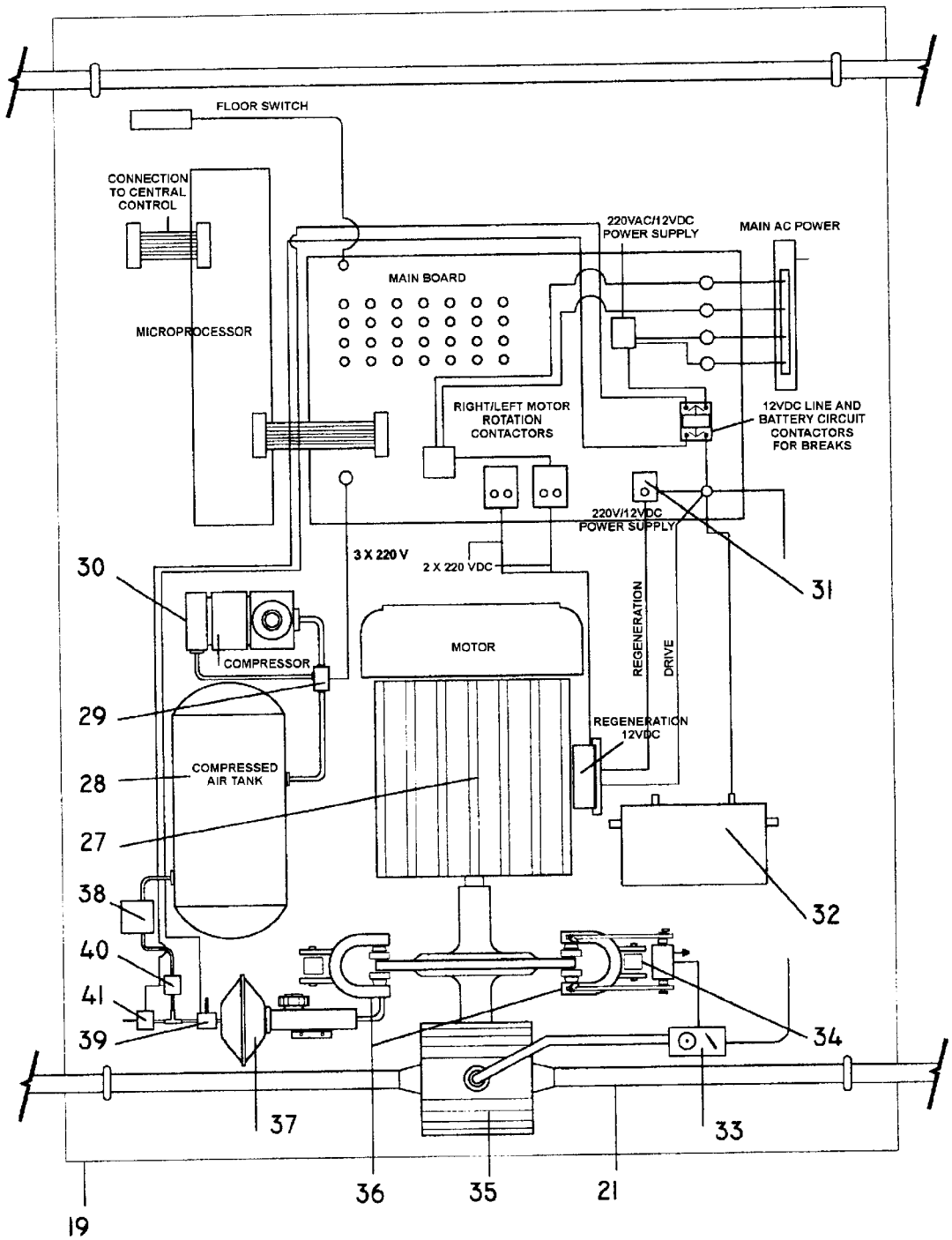
FIG. 7 is a front view of the engine assembly of FIG. 5.

FIGS. 7 and 8 show the engine subsystem, which is mounted on a sub chassis 19 which is fixed on to the main chassis or cantilevers 2. The engine subsystem comprises a well known DC power electric motor 27, the power of which will be calculated for each project separately. The motor is located at the back of the cabin 3 and between the two wheel guides C. The motor's function is to produce the mechanical traction and also for stopping. When the motor is used for stopping/breaking, kinetic energy is transformed into DC current in a well known process where the motor acts as a DC generator. A regulated low voltage power supply may be energized by the DC current used to recharge the electric storage battery 32. The electric motor 27 is coupled via a differential gear 35 to the traction axle 21. The DC motor energy may be supplied through current collector bars that receive DC energy from conductors attached to the wheel guides (see FIG. 10, ref. 48).

The engine assembly also comprises: a) a separately powered AC three phase motor air compressor 30, which fills a compressed air supply tank 28 which is controlled by a pressure control device 29; b) a 220 VAC/12 VDC power supply 31 for recharging the electric storage battery 32; c) a main control board that controls electrical power supplies, movement commands and the overall computer based control and an hydraulic disc brake and gang 36, activated by compressed air, through a servo mechanism 37. This mechanism is controlled by two 12 V DC electric valves 38 and 39 that work when the motor is turned on and when arriving to each stop. The DC supply for these valves is taken from the 110 VAC normal power line and further stepped down and rectified. In order to guarantee that the overall system functions under unexpected power failures the first valve 38, which controls the output of compressed air from the tank to the servo, remains always open and only closes when the engine 27 starts to run, and the servo 39 opens for unlocking the system. The axle 21A is fixed and is in charge of keeping the distance between the wheel assemblies.

Security subsystem

FIG. 7 shows the security subsystem, which comprises the emergency parachute 33, fixed to the differential gear 35 that controls an eventual unexpected fall checking the turns against a number of predetermined ones. To do this, a centrifuge system activates an electromagnet that urges, thanks to two levers with cams on its ends, the brake shoe against the set of breaking discs. This subsystem 34 also is energized by the 12 V DC electric battery 32. Both, the parachute and the braking system, are connected to one same double-pole double-throw switch. When voltage supply is present, the contacts allow the 12 V DC current to go through; when voltage is not present, the contacts open and connect the circuit to the electric battery 32. Upon energy breakdown the vehicle goes to the floor right below. The electric battery 32 allows also to release pressure of the servo 37 through the valve 41. At the same time, the valve 40 stops air the tank air supply, allowing the vehicle, in vertical position or in any sloped track, to come down to the nearest stop. When arriving to the nearest floor, the floor switch cuts the circuit letting the air enter the servo and block the programmed stops. This subsystem is activated from the control panel of the cabin 3. Simultaneously, the door are opened and the floor entrances and exits may be manually opened.

Figure 14:
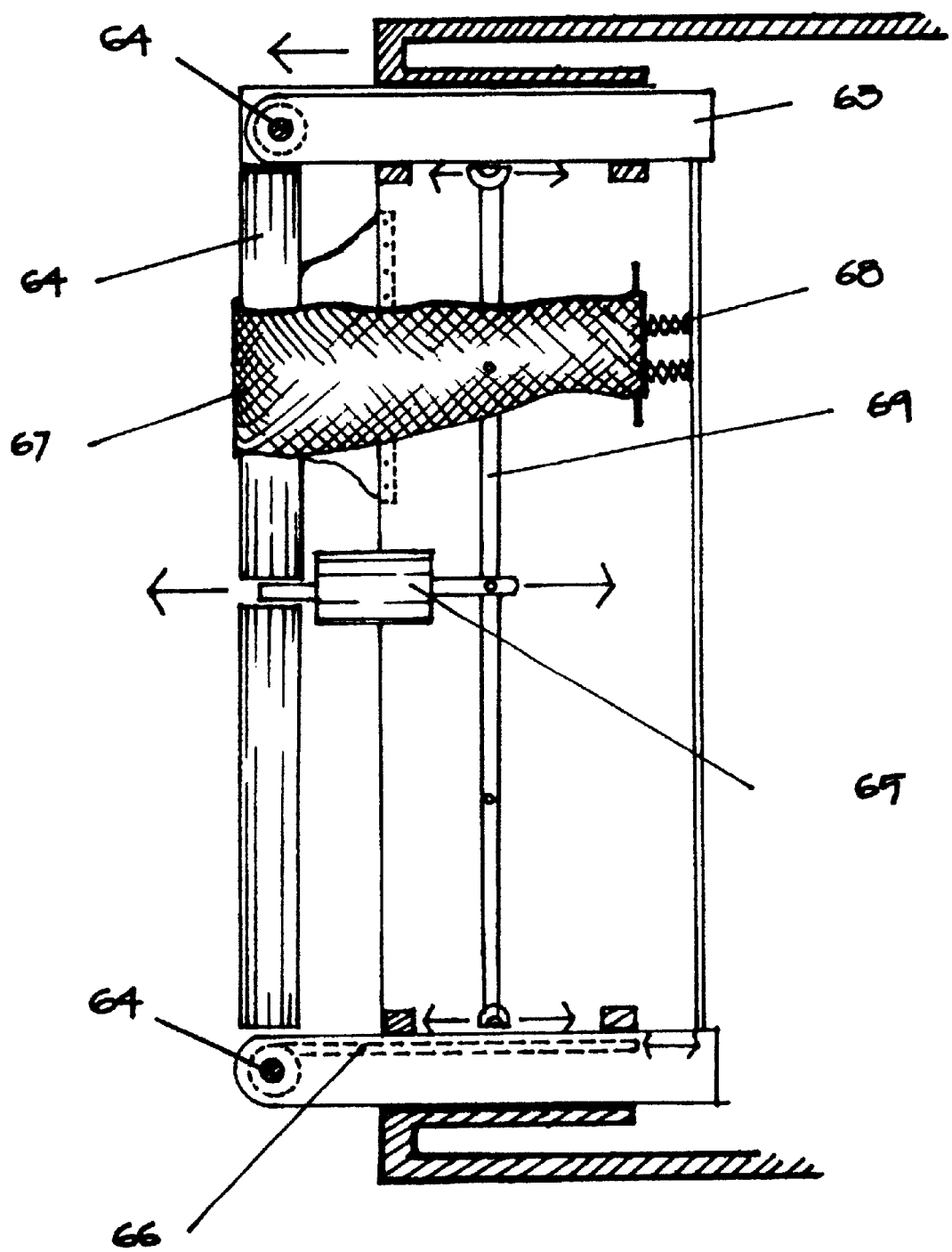
FIG. 14 is a side enlarged view of the seal between the cabin and the level floor on the desired stop (see reference 18 in FIG. 8).

FIG. 14 shows the sealed closing between the cabin and the floor entrances. Each door comprises a movable gangway 18 (shown on FIGS. 3 and 4) which moves towards the frame of each floor when the cabin is stopped in order to allow a sealed engagement. The sealed closing is made up of four fireproof films/membranes 67, one in the floor, another one on the roof and the other ones on each side. The membranes are fixed on one end to the cabin and at the other one they are tightened by springs 68. A pneumatic piston 65, fed by the air tank of the engine assembly, uses levers 69 to push four small beams 63 from the structural frame, together with four rollers 64, two horizontal ones (roof and floor) and two vertical ones (sides), which are inserted in each beam. When the beams stretch telescopically, they unfold the membranes 67, rolling through the rollers 64 which fit right on the frame of the floor door. The interior walls of the gangway are flat so as to enable easy access for people and goods. The floor also comprises a metal plate 66 telescopically placed under the cabin and fixed to the rollers, which unfolds with the membrane. The metal plate 66 allows the floor to be steady and firm for stepping on it. The column 63 shows an end with an element that acts as a linkage of two semi circular sections.

C) Wheel guide subsystem:

The Wheel Guide Subsystem (WGSS) is formed by two subsystems:

c-1) Switching Tracks
c-2) Tracks

FIG. 10 shows plugged and screwed metal wheel guides 47 formed by two opposed out facing track section portions, separated by a structural central portion. In a preferred embodiment the wheel track may be semicircular and in an alternative embodiment it may be "U" shaped. The semicircular track or the "U" shaped section piece forms the rolling track for the set of each subset of wheels of the vehicle, preferably formed each by ten or twelve wheels, half of which will be rolling on the front semicircular or "U" shaped track (left side in FIG. 1) and the other subset of wheels on the opposite side (right side on FIG. 1). The number of wheels is here mentioned as an example but will strongly depend on the cabin's weight and the load to be transported. An ultra small vehicle designed only for carrying light goods may need only two wheels but, due to the cabin's weight a reasonable number of wheels ranges with two subsets of 5 to 12 wheels each. Obviously, if the cabin is intended to be used for heavy load duty, the number of wheels should be increased accordingly in order to allow that the weight and frictional forces involved are kept within design limits. The wheel guides C (FIG. 3) will adapt to any straight or curved track. The only issue to be considered is the turning radio on the concave curves, being of maximum importance when working with a convoy. However, no particular consideration is needed on the convex curves, although the inward reaction force to centrifugal effect on very sharp turn curves may also be an important factor on long distance, high speed, track design.

FIG. 3 shows the wheel guide system C which allows for changes in direction by means of the switching tracks 13. These are track portions constructed with the same shaped sections as the normal tracks but are formed by more than one member. In some cases bigger cross sections may be needed since their own weight may exceed maximum load limits. In these cases, the tracks will have additional structural members instead of the braces 16 engaging the channel A. When track switching is needed, all the articulated pieces 13 of this subsystem are moved by hydraulic cylinders and pistons 15, which will open or close the switching tracks 13. In order to keep central remote supervision on track switching, these include an electric coupling 48/49, on/off information sensors and remote relays connected to the Central Control Station that are attached to the wheel guides C, for interrupting or reactivating the energy. The wheel guides C of the wheel guide subsystem are hollow and inside of these electricity conductors may be located, being able to supply energy before and after each track switching position. This is another advantageous feature respect of prior art. This feature can be also used as prevention against vehicle collision. Additional to the hydraulic opening/closing device, the switching track includes a security hook 14 on each wheel guide C. These security elements may be moved by an electric DC motor reducer or by an hydraulic device and are formed by flat hooks that slide over a bolt fixed to the wheel guide C, through a groove. It's movement is produced by an eccentric, starting (when closed) in the axle of the hook 14 and spinning 90°, therefore moving away from the latter and forcing a rotation of the hook's head. The system allows to improve certain adjustments according to the movement produced by the hydraulics device 15, and guarantees tight engagement.

FIG. 10 shows in detail other important elements such as the sliding tracks 25. These are made up of light textured concrete (i.e. cement+sand+pebbles), painted with asphalt, or else with hard wood surface, and provide for the contacting surface between the wheel guides C and the wheels 22. Their shape, on one side, adjusts to the wheel guide, and in the opposite side (concave section) they support the rolling rubber wheels 22 (of semicircular section). The concave shaped track centers the wheels on the wheel guides and, thanks to its profile which generally corresponds with the cross section of the wheels. In a preferred embodiment the track is smooth surfaced and in an alternative embodiment the wheel contacting surface is grooved. In another alternative embodiment the grooves follow the track's direction in a zigzag design and in a further alternative embodiment the grooves follow in a generally parallel design the wheel guide direction.

D) Central Control Station System

FIG. 1 schematically shows the Central Control Station (CCSS) which centralizes all the functions of the autonomous transport system. The CCSS monitors all sensor and alarm signals, controlling and directing all central commands. According to its use and depending on its scale and functions, the Central Control Station may be minimum and automatic. It comprises well known microprocessor based programmed circuitry which determines the sequence, quantity of vehicles, routes, etc. In larger scale transportation, where people are involved, live operators, aided with computer based premises supervise the multiplicity of routes itinerary, in one or more urban settlements, controlling interaction within them, being able to increase the number of vehicles working on rush hours, overpopulated places, emergencies, etc. In medium complexity systems, PC based computer systems may be sufficient; however in large inter urban premises larger computing mainframes may be needed for controlling vehicle traffic. The Central Control Station will transmit and receive the control signals by radio or by cables, using well known carrier wave frequency or time sharing multiplexing techniques. In an alternate embodiment, in premises where RF transmission is difficult or unreliable, a separate main current conductor may connect as much signal cable pairs as vehicles running on the track to work in the channel. Finally, in noisy environments optical fiber transmission techniques are preferred.

Figure 15:
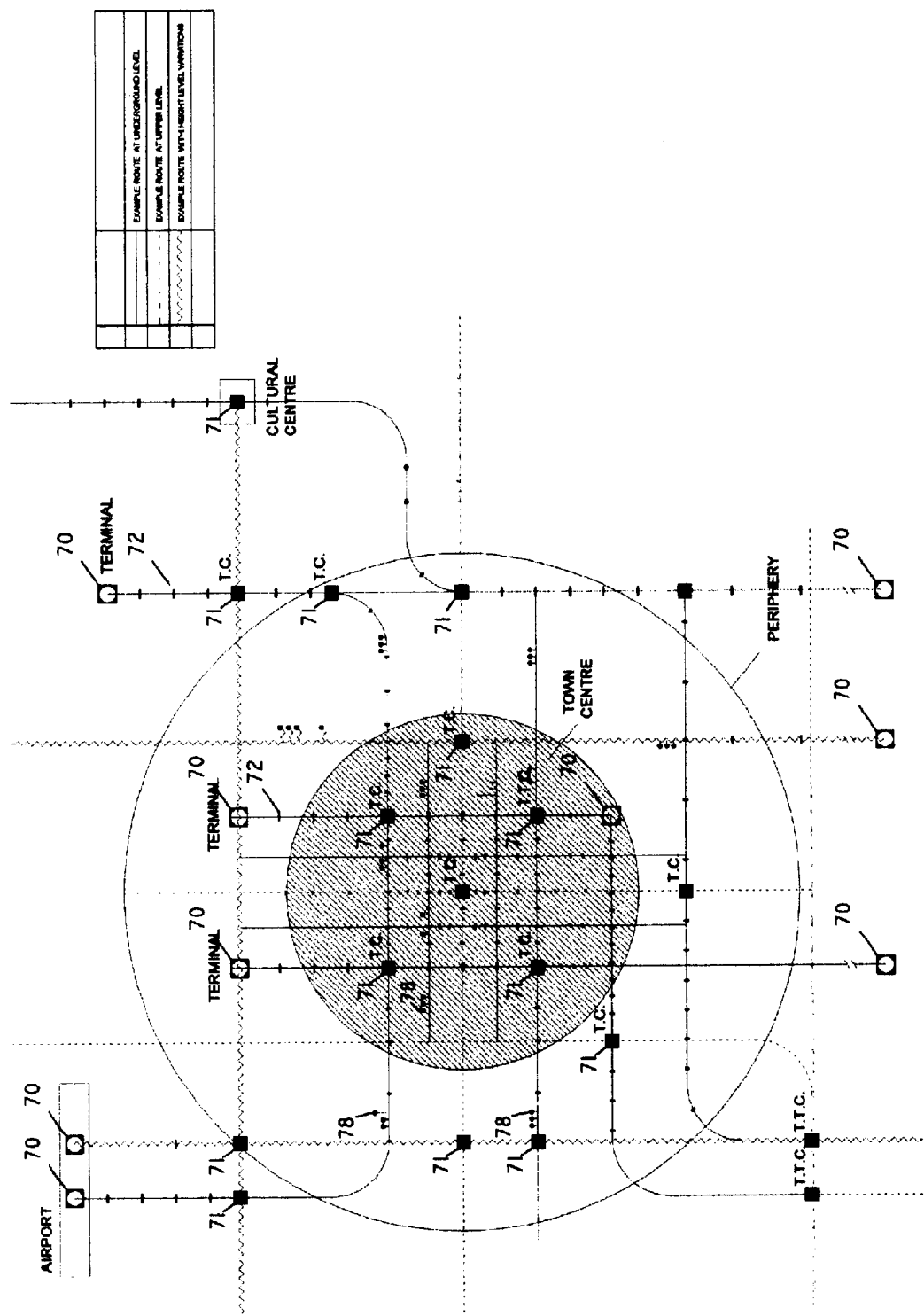
FIG. 15 is a top view of an urban embodiment and its railway.

FIG. 15 shows a preferred embodiment of a structure of orthogonal wheel guide tracks where the end terminals 70, transference terminals 71 and simple stop terminals 72 may be seen. Although the wheel guide system may be designed to follow any track path design, an orthogonal track has been selected as an example due to its simplicity and easiness of adding or inserting new wheel guide tracks. It has been found that, due to its versatility, a vehicle according to the invention may link two distant points faster than a bus, even if the bus runs through a imaginary hypotenuse and the vehicle follows the corresponding right sides of an imaginary triangle having both points as apexes.

In FIG. 15, the graphic 73 may appreciate the increase in average speed that the vehicle achieves when moving inside a densely populated area. In the same figure, graphic 74 shows the vehicle's average speed, maximum speed and run time curve.

FIG. 16 shows a preferred embodiment of a transference station 71, a private-to-private transference station 75, a private-to-public transference station 76 and a public-to-public transference station 77, where the wheel guide tracks run at different heights and are linked by vertical tracks 78.

Figure 17:
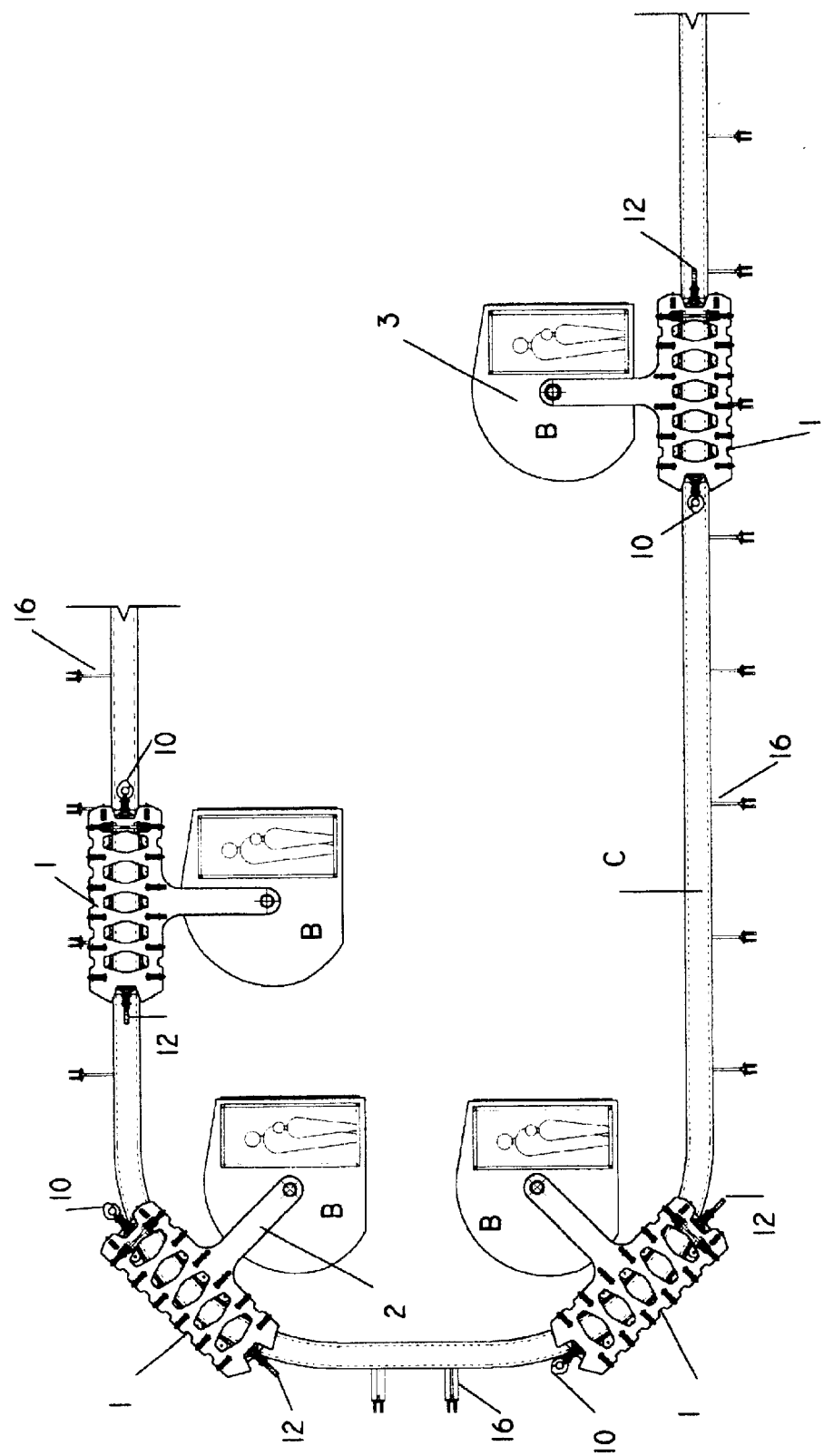
FIG. 17 is a side view of an end station embodiment particularly adequate for areas with space constraints.

FIG. 17 shows an embodiment of a station to be constructed where there are space limitations. The two way tracks C will run on overlapping planes.

Figure 18:
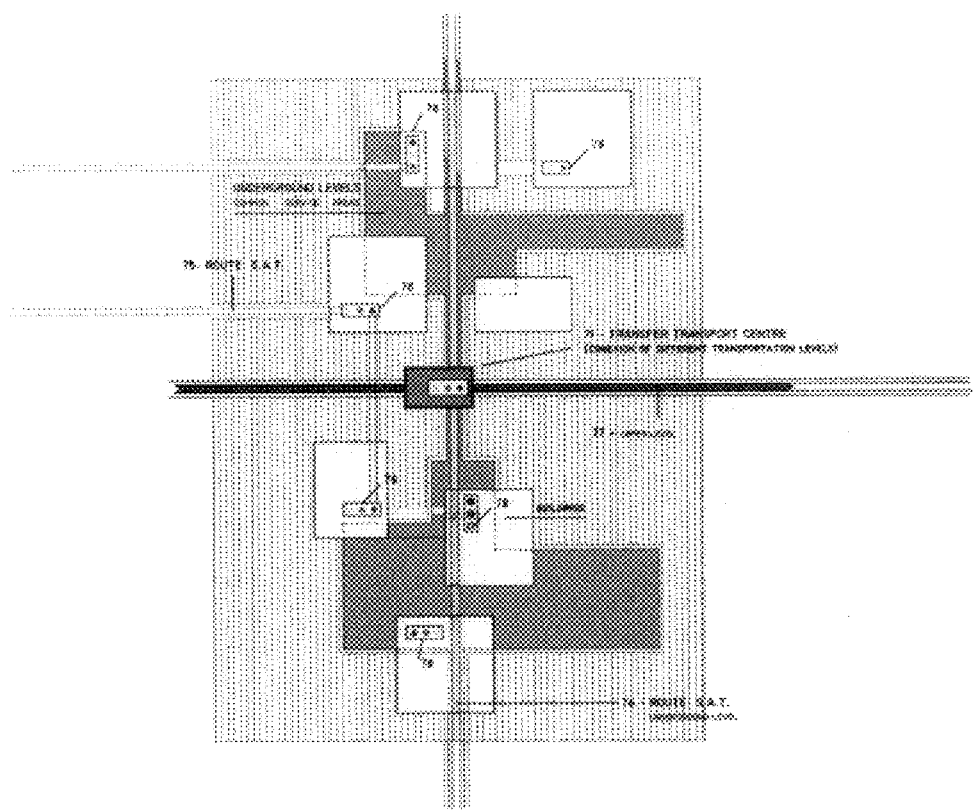
FIG. 18 is side cross section view of an end station embodiment, particularly adequate for areas with height limitations.

FIG. 18 shows a terminal designed for being constructed on high places and interacting with main guidetracks. Thanks to the vehicle novel driving design, these may go up and down with a minimum of space requirements, linking any kind of living areas, commerce stores, etc.

Figure 19:
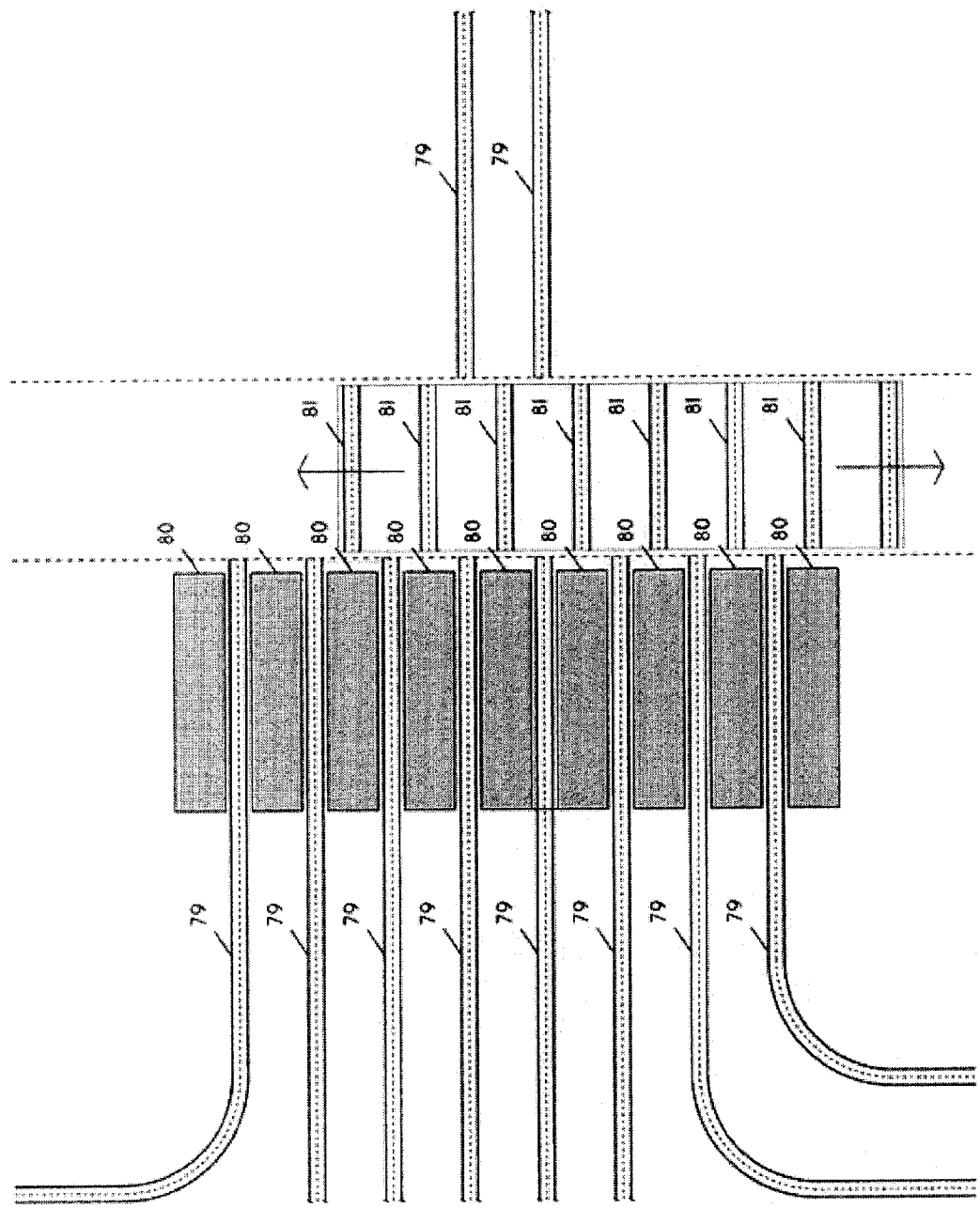
FIG. 19 is a side view of the automation for an end station.

FIG. 19 shows an underground station embodiment which may be constructed with no restrictions under any public area such as a park or plaza and may need less free space than an equivalent underground car parking lot.

FIG. 19 shows an embodiment of the automation of an end terminal, where wheel guides 79 allow for access and departure of the vehicles and platforms 80 allow people to enter and leave them. The figure also shows a loading device 81 which consists of a laterally movable platform which allows to carry out loading and unloading of people and goods oto and from several vehicles placed on different tracks at a time. A group of vehicles (train or convoy) may stay on the switching track and the latter will position the convoy in order to access a platform or depart from it. The loader may also act as a parking distribution device or as a space backup during peak traffic load.

Design features of the ATS

Vehicle people load capacity: 20 (average 150 lbs. weight each)

Convoy people load capacity (4 vehicles): 80 ( average 150 lbs. weight each)

Average station distance: 400 m

Track convoy density: 1 train/km

Time for each stop: variable

Time delay for opening and closing door: 16 seconds

Time delay for running 400 m: 32 seconds

Average speed: 30 km/h

Time delay for running 1000 m: 120 seconds

In a 10 km rail road as an example:

Number of convoys: 20 (back and forth)

Average passengers traveling/hour: 5,280

References

In order to aid the understanding of the enclosed drawings, the following list shows the references included therein.

Figure 5:
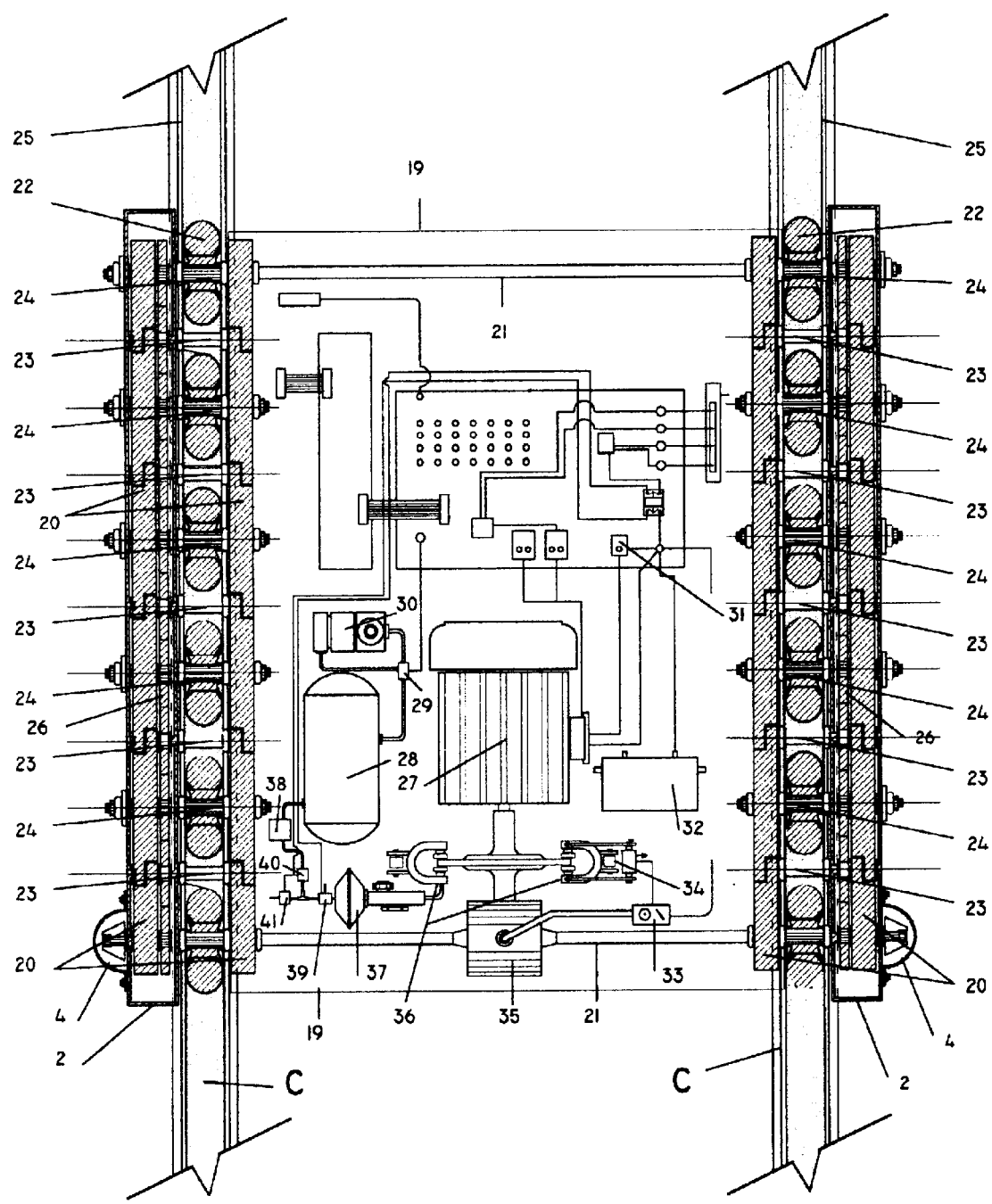
FIG. 5 is a cross sectional front view through line E-E' of FIG. 1, of the wheel traction assembly and also a front view of the unit's engine assembly and the engagement of the articulated (cantilever) sub-chassis to the main chassis.

| Element | Number/Letter |
|---|---|
| Channel | A |
| Vehicle | B |
| Wheel guide | C |
| Central Control Station | D |
| FIGS. 1, 1A, 2, 9 and 17 | |
| | |
| Traction assembly | 1 |
| Cantilever | 2 |
| Cabin | 3 |
| Differential Gear | 4 |
| Fluting axle of conic pinions. | 5 |
| Conic Pinions. | 6 |
| Springs. | 7 |
| Sliding members | 8 |
| Half section of a sliding piece. | 9 |
| Coupling Device | 10 |
| Pivots | 11 |
| Coupling Device | 12 |
| FIGS. 3, 4, 4A, 9 and 17 | |
| | |
| Switching tracks | 13 |
| Security hooks | 14 |
| Hydraulic piston acting on the guides | 15 |
| Structural attachment to the channel | 16 |
| Fire barrier/damper | 17 |
| Sealed cabin closing device | 18 |
| FIGS. 5 and 9 | |
| | |
| Sub-chassis of the engine set | 19 |
| Sub-chassis of the traction battery | 20 |
| Traction axle | 21 |
| Fixed axle | 21A |
| FIG. 6 | |
| | |
| Wheels | 22 |
| Plain gear axle | 23 |
| Fluting axle | 24 |
| (wheels to gears coupling) | |
| Rolling Track | 25 |
| Gears | 26 |
| FIG. 7 | |
| | |
| Engine | 27 |
| Compressed air tank | 28 |
| Pressure control device | 29 |
| Air compressor | 30 |
| 12 VDC power supply | 31 |
| Electric battery | 32 |
| Parachute | 33 |
| Emergency breaks | 34 |
| Differential gear | 35 |
| Hydraulic disc brake and gangs | 36 |
| Servo brake | 37 |
| Electric valve 1 | 38 |
| Electric valve 2 | 39 |
| Electric valve 3 | 40 |
| Electric valve 4 | 41 |
| FIGS. 8, 8A, 8B and 9 | |
| | |
| Motor-reducer (also FIG. 9) | 42 |
| Motor-reducer axle | 43 |
| Differential gear | 44 |

-continued

Figure 13:
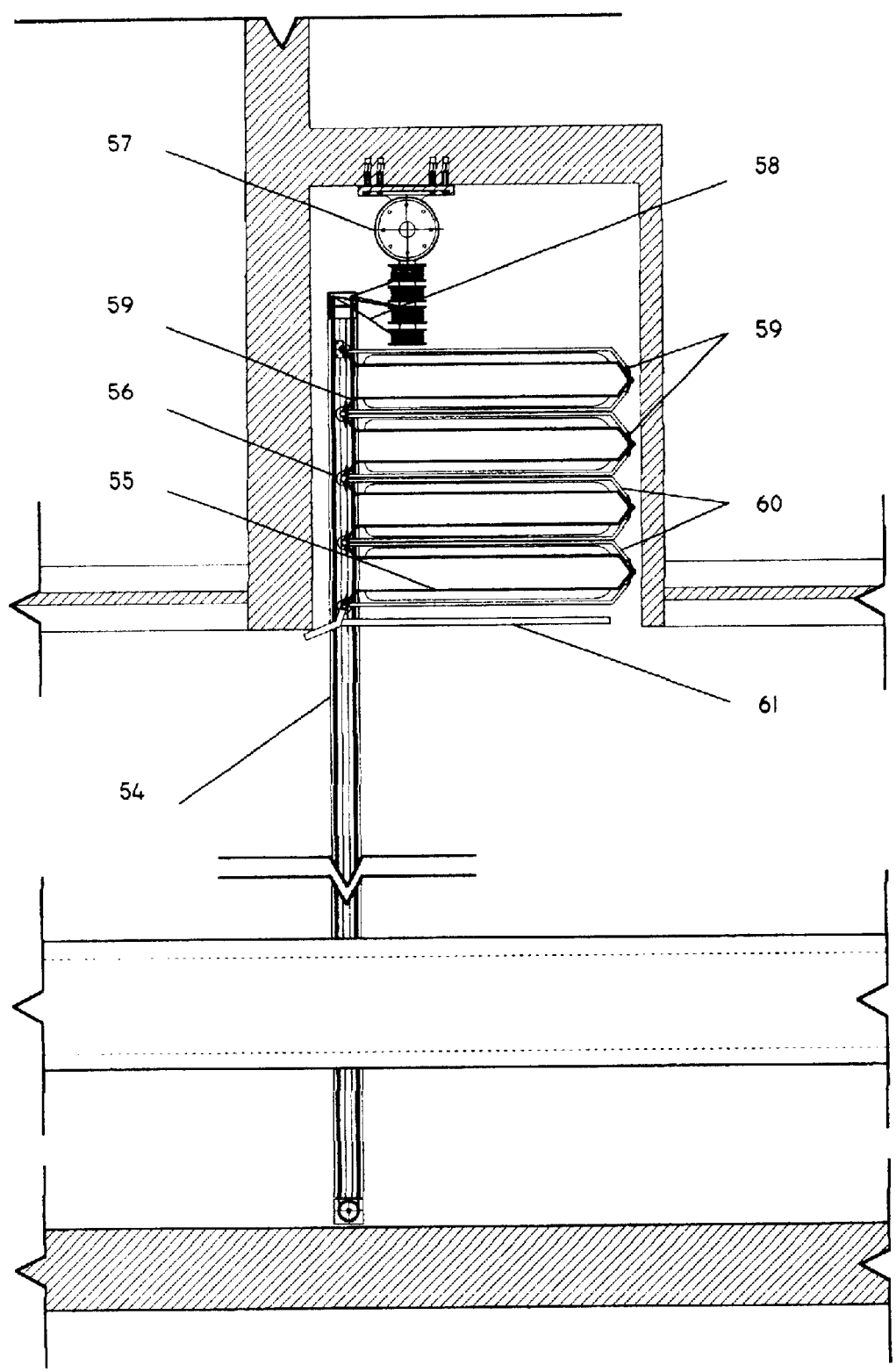
FIG. 13 is a front view of the fire-barrier in an open position.
Figure 20:
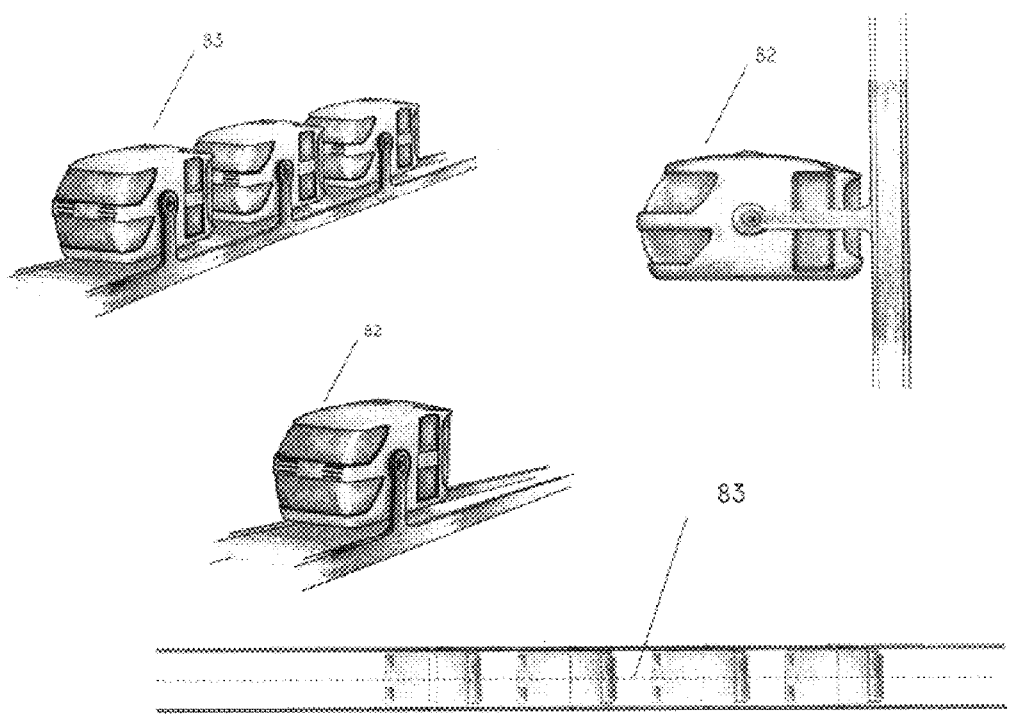
FIG. 20 is a top perspective view of a vehicle and a convoy.
Figure 22:
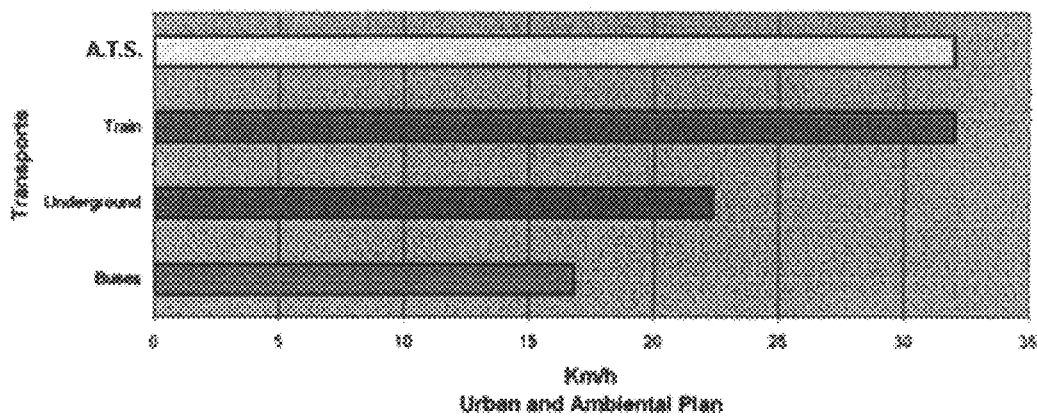
FIG. 22 shows a bar graph of the average speed of different transport means in the city of Buenos Aires.

| Element | Number/Letter |
|---|---|
| Cabin's sub-chassis | 45 |
| Ball-bearing | 46 |
| FIG. 10 | |
| Wheel guide plug-ins | 47 |
| Electric coupling | 48 |
| Electric coupling | 49 |
| FIG. 11 | |
| Pendulum | 50 |
| Amplifying movement subsystem | 51 |
| Regulated contact subsystem | 52 |
| Glycerine | 53 |
| FIGS. 12 and 13 | |
| Fire barrier rails | 54 |
| Metal webs | 55 |
| Axle and ball-bearings | 56 |
| Electric motor reducer | 57 |
| Traction cable | 58 |
| Hinges | 59 |
| Fireproof plates | 60 |
| Guide-crossing reinforcement | 61 |
| Adjustment device | 62 |
| FIG. 14 | |
| Structural frame | 63 |
| Roller axle | 64 |
| Hydraulic piston | 65 |
| Metal web | 66 |
| Membrane | 67 |
| Springs | 68 |
| Rubber adjustment element | 69 |
| FIGS. 15 and 18 | |
| Terminal end station | 70 |
| Transference station | 71 |
| Intermediate stop station | 72 |
| Speed distribution bar graph | 73 |
| Speed and time bar graph | 74 |
| FIGS. 15 and 16 | |
| Route between a private stops | 75 |
| Route between a private stop and a public stop | 76 |
| Route between a public stops | 77 |
| Vertical track | 78 |
| FIG. 19 | |
| Guide way | 79 |
| Platform | 80 |
| Loading device | 81 |
| FIG. 20 | |
| Vehicle | 82 |
| Convoy or train | 83 |

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. An autonomous transportation system including horizontal, sloped and vertical wheel guide sections connected by transitional or curved wheel guide sections, one or more individual vehicles or groups of chained vehicles forming trains and traveling on said wheel guide sections, each vehicle comprising a traction wheel assembly, a cantilever portion, a cabin comprising a main chassis and an articulated sub-chassis, an engine assembly, a security system, and a leveling system for keeping said cabin horizontal when the vehicle runs along a non-horizontal track; wherein:

each of said wheel guide sections is formed by two opposed, wheel tracks separated by a structural central portion;

said traction wheel assembly comprising two subsets of wheels, each of said wheels being made by an resilient anti-slippage material and comprising anti-slippage surface design;

each of said wheel tracks forming a rolling track for each of said subset of wheels, said wheel tracks being constructed with an anti-slippage material;

said cantilever portion being engaged at one end to said traction wheel assembly and being engaged to said cabin at its other end by joint means, whereby the center of gravity of the cabin is distant from the longitudinal center axis of the wheel guide thereby forming a lever system which has its force application point at said joint means; being the combined weight of said cabin and its contents the applied force of said lever system;

whereby at least one wheel of each said subsets of wheels is urged against their corresponding wheel track by pressing forces that result from the torque of said lever system, whereby the frictional forces between said wheels and said wheel tracks avoid wheel slippage when the vehicle is placed on a non horizontal track.

2. The system of claim 1, wherein each of said wheels is urged against said wheel tracks by resilient means for keeping their contact to said wheel tracks when said pressing forces are zero.

3. The system of claim 2, wherein said resilient means are compression springs.

4. The system of claim 1, wherein each subset of traction wheels comprises at least two wheels.

5. The system of claim 4, wherein each subset of traction wheels comprises 5 to 12 wheels.

6. The system of claim 1, wherein said resilient material of each of said wheels is supported on a light alloy material and wherein said resilient material is rubber.

7. The system of claim 1, wherein each of said wheels has contacting resilient surface having a substantially U shaped cross sectional profile.

8. The system of claim 1, wherein each of said wheels has contacting resilient surface having a substantially semicircular cross sectional profile.

9. The system of claim 1, wherein each of said wheels has contacting resilient surface having a substantially parabolic cross sectional profile.

10. The system of claim 1, wherein each of said wheels has contacting resilient surface having a substantially semi-elliptical cross sectional profile.

11. The system of claim 1, wherein said wheels are attached by grooved axles and gears, said gears connecting all the wheels of each subset together.

12. The system of claim 1, wherein said wheels are joined to said articulated sub chassis by axles that pass through from one side to the other of said wheel assembly.

13. The system of claim 1, wherein said wheel assembly comprises grooved axles that join the wheels and gears to said sub-chassis and the latter to said main chassis; and said wheel assembly also comprises smooth surface axles which allow for the rotation of articulated gears and for the rotation of a turning corrector, wherein said turning corrector provides for articulation of the sub-chassis between any pair of said wheels and works as a support for a connecting coupling gear that links each wheel gear.

14. The system of claim 1, wherein said wheels are attached to said articulated sub-chassis by means of said grooved axles, and said grooved axles also attaching said sub-chassis to said cantilever.

15. The system of claim 1, wherein said grooved axles are fixed to said cantilever by sliding elements retained by springs.

16. The system of claim 1, wherein said wheel subsets are connected to each other by a pair of conic pinions and a differential mechanism joined by a sliding fluting axle for absorbing the displacement of one wheel subset with respect to the other.

17. The system of claim 1, wherein each wheel track has a wheel contacting smooth surface.

18. The system of claim 1, wherein the wheel contacting surface of each wheel track comprises grooves.

19. The system of claim 18, wherein said grooves follow a zigzag design.

20. The system of claim 18, wherein said grooves are generally parallel to the wheel track's longitudinal geometrical axis.

21. The system of claim 1, wherein the wheel contacting surface of each of said opposed wheel tracks have a generally semicircular cross section.

22. The system of claim 1, wherein the wheel contacting surface of each of said wheel tracks have a generally U shaped cross section.

23. The system of claim 1, wherein the wheel contacting surface of each of said wheel tracks have a generally parabolic cross section.

24. The system of claim 1, wherein the wheel contacting surface of each of said wheel tracks have a generally semi-elliptical cross section.

25. The system of claim 1, wherein the leveling system comprises at least one axle mechanically coupled to an electric motor reducer through differential gears, for allowing rotation of the cabin.

26. The system of claim 1, wherein the leveling system rotates the cabin through an angle of up to 360° with respect to said cantilever.

27. The system of claim 26, wherein said leveling system comprises at least one axle coupled to an electric motor reducer by means of a set of differential gears, being said gears positioned on the axis of said joint means that links said cantilever with said cabin.

28. The system of claim 26, wherein said leveling system comprises a pendulum located on a side of said cabin and on a same geometrical axis as said joint means of said cabin.

29. The system of claim 28, wherein said pendulum is immersed in a container filled with glycerine, and being articulated to a secondary lever element.

30. The system of claim 28, wherein said leveling system includes a set of electric contacts connected to an electric motor reducer.

31. The system of claim 29, wherein said container contains liquid movement limiting moles.

32. The system of claim 1, wherein said cabin includes floor indicators, electronic message boards, message speakers, closed circuit TV sets and security video cameras, commanded from a central control station.

33. The system of claim 1, wherein said cabin includes elements for choosing final destination or intermediate stops and a calling system of every terminal stop being handled by a central computer.

34. The system of claim 1, wherein said cabin is mounted on said sub-chassis, the latter having U shaped section and being engaged by said joint means of said cantilevers.

35. The system of claim 1, wherein said cabin comprises more than one access, one at the front and one on each side.

36. The system of claim 1, wherein each of said vehicles includes an autonomous driving engine.

37. The system of claim 36, wherein said driving engine is based on a DC power electric motor.

38. The system of claim 37, wherein said DC power electric motor is used for driving and for stopping the vehicle.

39. The system of claim 1, further including an AC powered three phase motor air compressor and a compressed air supply tank, said compressor supplying with air to said tank.

40. The system of claim 1, further comprising a main control board for controlling electrical power supplies and overall vehicle's movements.

41. The system of claim 39, further comprising an hydraulic disk brake and gang, activated by compressed air through a servo mechanism.

42. The system of claim 41, wherein said servo mechanism is controlled by two 12 V DC electric valves which are activated when said motor is turned on and when said cabin arrives to each stop.

43. The system of claim 42, wherein said valves are driven by AC power which is obtained by stepping down the 110 V AC power line.

44. The system of claim 42, wherein one of said valves controls the output of the compressed air from the tank to the servo mechanism and remains open under unexpected power failure, and closes when the engine starts; and a second servo mechanism opens air supply for unlocking the system.

45. The system of claim 1, wherein said security system comprises an emergency parachute, fixed to a differential gear, and comprising an electromagnet that urges a brake shoe against a set of braking disks by means of two levers with cams on its ends.

46. The system of claim 1, wherein said security system is energized by a 12 V DC electric battery.

47. The system of claim 46, wherein said electric battery further energizes a valve that opens for releasing pressure of a servo mechanism and, at the same time, a valve closes the air supply from an air tank supply, when energy breakdown occurs.

48. The system of claim 47, wherein said vehicle being positioned in a sloped or vertical track, under energy failure comes down to a nearest floor, whereby a floor switch interrupts the circuit letting air enter the servo mechanism and blocking the programmed stops.

49. The system of claim 1, wherein said cabin comprises a movable gangway which moves towards the frame of each floor when the cabin stops on each floor.

50. The system of claim 49, wherein said gangway includes a sealed closing made up of four fireproof membranes, one on the floor, one on the ceiling and one on each side.

51. The system of claim 50, wherein said membranes are fixed at one end to the cabin and are urged by springs at the other end, and comprising a pneumatic piston fed by said air; levers for pushing four small beams; and two horizontal rollers and two vertical ones, inserted in each beam.

52. The system of claim 1, comprising switching tracks constructed with the same shaped wheel sections as normal tracks and comprising more than one member.

53. The system of claim 52, wherein said switching tracks are moved by hydraulic cylinders and pistons and include electric couplings, on/off information sensors and remote relays connected to a central control station.

54. The system of claim 1, comprising a security hook on each wheel guide, movable by means of a DC electric motor reducer or by means of an hydraulic device, said hooks being formed by flat hooks that slide over a bolt fixed to said wheel guide through a groove, and each of said hooks comprising a head.

55. The system of claim 54, wherein said security hooks move due to the movement of an eccentric, starting in the axle of said hook and spinning 90°, thus moving away from the latter, forcing thereby a rotation in a head thereof.

56. The system of claim 1, wherein said wheel guide sections are hollow and able to allow for electricity conductors to be located inside.

57. The system of claim 32, wherein said central control station is controlled by automatic microprocessor based circuitry.

58. The system of claim 32, wherein said central control station is controlled by personal computer local area networks or mainframe computer premises.

59. An autonomous transportation vehicle to be used individually or in groups forming trains and running on wheel guides having wheel tracks, said vehicle comprising a traction wheel assembly, a cantilever portion, a cabin comprising a main chassis and an articulated sub-chassis, a leveling system that keeps said cabin horizontal when the vehicle runs along non-horizontal wheel guides, and an engine assembly, wherein:

said traction wheel assembly comprises two subsets of wheels, each of said wheels being made of a resilient anti-slippage material and comprising anti-slippage surface design;

said cantilever portion being engaged at one end to said traction wheel assembly and being engaged to said cabin at its other end by joint means, whereby the center of gravity of the cabin is distant from the longitudinal geometrical center axis of said wheel guides, and forming a lever system which has its force application point at said joint means; being the combined weight of said cabin and its contents the applied force of said lever system;

whereby at least one wheel of each said subsets of wheels is urged against their corresponding wheel track by pressing forces that result from the torque of said lever system, whereby the frictional forces between said wheels and said wheel tracks avoid wheel slippage when the vehicle is placed on a non horizontal track.

60. The vehicle of claim 59, wherein each of said wheels is urged against said wheel tracks by resilient means for keeping their contact to said wheel tracks when said pressing forces are zero.

61. The vehicle of claim 60, wherein said resilient means are compression springs.

62. The vehicle of claim 59, wherein each subset of traction wheels comprises at least two wheels.

63. The vehicle of claim 62, wherein each subset of traction wheels comprises 5 to 12 wheels.

64. The vehicle of claim 59, wherein said resilient material of each of said wheels is supported on a light alloy and wherein said resilient material is rubber.

65. The vehicle of claim 59, wherein each of said wheels has contacting resilient surface having a substantially U shaped cross sectional profile.

66. The vehicle of claim 59, wherein each of said wheels has contacting resilient surface having a substantially semi-circular cross sectional profile.

67. The vehicle of claim 59, wherein each of said wheels has contacting resilient surface having a substantially parabolic cross sectional profile.

68. The vehicle of claim 59, wherein each of said wheels has contacting resilient surface having a substantially semi-elliptical cross sectional profile.

69. The vehicle of claim 59, wherein said wheels are attached by grooved axles and gears, said gears connecting all the wheels of each subset together.

70. The vehicle of claim 59, wherein said wheels are joined to said articulated sub chassis by axles that pass through from one side to the other of said wheel assembly.

71. The vehicle of claim 59, wherein said wheel assembly comprises grooved axles that join the wheels and gears to said sub-chassis and the latter to said main chassis; and said wheel assembly also comprises smooth surface axles which allow for the rotation of articulated gears and for the rotation of a turning corrector, wherein said turning corrector provides for articulation of the sub-chassis between any pair of said wheels and works as a support for a connecting coupling gear that links each wheel gear.

72. The vehicle of claim 59, wherein said wheels are attached to said articulated sub-chassis by means of said grooved axles, and said grooved axles also attach said sub-chassis to said cantilever.

73. The vehicle of claim 59, wherein said grooved axles are fixed to said cantilever by sliding elements retained by springs.

74. The vehicle of claim 59, wherein said wheel subsets are connected to each other by a pair of conic pinions and a differential mechanism joined by a sliding fluting axle for absorbing the displacement of one wheel subset respect to the other.

75. The vehicle of claim 59, comprising at least one axle mechanically coupled to an electric motor reducer through differential gears, for allowing rotation of the cabin to keep it leveled.

76. The vehicle of claim 59, comprising a cabin leveling system which enables the cabin to rotate through an angle of 180° in normal conditions, and up to 360° in space constraining positions, with respect to said cantilever.

77. The vehicle of claim 76, wherein said leveling system comprises at least one axle coupled to an electric motor reducer by means of a set of differential gears, being said gears positioned on the axis of said joint means that links said cantilever with said cabin.

78. The vehicle of claim 76, wherein said leveling system comprises a pendulum located on a side of said cabin and on the same geometrical axis as said joint means of said cabin.

79. The vehicle of claim 78, wherein said pendulum is contained in a container containing glycerine, and being articulated to a secondary lever element.

80. The vehicle of claim 76, wherein said leveling system comprises a set of electric contacts connected to an electric motor reducer.

81. The vehicle of claim 79, wherein said container includes liquid movement limiting moles.

82. The vehicle of claim 59, wherein the cabin includes floor indicators, electronic message boards, message speakers, closed circuit TV sets and security video cameras, commanded from a central control station.

83. The vehicle of claim 59, wherein the cabin includes elements for choosing final destination or intermediate stops and a calling vehicle of every terminal stop being handled by a central computer.

84. The vehicle of claim 59, wherein the cabin is mounted on said sub-chassis, the latter having U shaped section and being engaged by said joint means of said cantilevers.

85. The vehicle of claim 59, wherein the cabin comprises more than one access, one at the front and one on each side.

86. The vehicle of claim 59, wherein each of said vehicles includes an autonomous driving engine.

87. The vehicle of claim 86, wherein the driving engine is based on a DC power electric motor.

88. The vehicle of claim 87, wherein said DC power electric motor is used for driving and for stopping the vehicle.

89. The vehicle of claim 59, further including an AC powered three phase motor air compressor and a compressed air supply tank, said compressor supplying with air to said tank.

90. The vehicle of claim 59, further comprising a main control board for controlling electrical power supplies and overall vehicle's movements.

91. The vehicle of claim 89, further comprising an hydraulic disk brake and gang, activated by compressed air through a servo mechanism.

92. The vehicle of claim 91, wherein said servo mechanism is controlled by two 12 V DC electric valves which are activated when said motor is turned on and when said cabin arrives to each stop.

93. The vehicle of claim 92, wherein said valves are driven by AC power which is obtained by stepping down the 110 V AC power line.

94. The vehicle of claim 92, wherein one of said valves, which controls the output of the compressed air from the tank to the servo mechanism remains open under unexpected power failure, and closes when the engine starts, and a second servo mechanism opens compressed air supply for unlocking the vehicle.

95. The vehicle of claim 59, wherein said vehicle comprises an emergency parachute, fixed to a differential gear, and comprising an electromagnet that urges a brake shoe against a set of braking disks, by means of two levers with cams on its ends.

96. The vehicle of claim 59, wherein said security vehicle is energized by a 12 V DC electric battery.

97. The vehicle of claim 96, wherein said electric battery further energizes a valve that opens for releasing air pressure of a servo mechanism and, at the same time a valve closes the compressed air supply from an air tank supply, under energy breakdown.

98. The vehicle of claim 59, wherein said cabin comprises a movable gangway which moves towards the frame of each floor when the cabin stops on each floor.

99. The vehicle of claim 98, wherein said gangway includes a sealed closing made up of four fireproof membranes, one on the floor, one on the ceiling and one on each side.

100. The vehicle of claim 99, wherein said membranes are fixed at one end to the cabin and being urged by springs at the other end, and comprising a pneumatic piston fed by said air; levers for pushing four small beams; and two horizontal rollers and two vertical ones, inserted in each beam.

101. An urban transport method carried out by a vehicle including horizontal and vertical wheel guide sections connected by transitional or curved guide sections, one or more individual vehicles or groups of chained vehicles forming trains and traveling on said wheel guide sections, each of said vehicles having a cabin, a wheel traction assembly running on wheel guides and a leveling system; the method comprising using one or more of said vehicles inside buildings or outdoors for transporting people or goods; leveling the cabin's position when the vehicle runs along a sloped or vertical wheel guide section to keep the cabin perfectly horizontal with respect to ground by means of said leveling system; wherein the method further comprises:

mounting each of said cabins on a position distant from the wheel guide central geometrical axis, thereby generating a torque effect that creates forces that urge at least one wheel of each of said wheel subsets against said wheel guides when said vehicle travels along sloped or vertical sections, thus avoiding slipping, being thereby each of said vehicles capable of traveling over horizontal, sloped or vertical guide sections without slipping.

102. The method of claim 101, wherein said one or more vehicles run on indoors wheel guides inside transport channels or run on outdoors wheel guides.

103. The method of claim 101, wherein the stopping positions are automated by pre-programmed schedules, or programmed on passenger's selection.

104. The method of claim 101, wherein the routes and schedules for more than one vehicle may be programmed within intervals on a same wheel track.

105. The method of claim 101, wherein the vehicles may be deviated or bypassed by means of switching tracks.

106. The method of claim 101, wherein the vehicles may be added or withdrawn from the different routes.

107. The method of claim 101, further providing complementary wheel tracks for over passing vehicles or as reserve routes.

108. The method of claim 101, further providing static resting spaces to be used for parking said vehicles in maintenance, emergency or normal loading situations.

109. The method of claim 102, wherein said transport channels are blocked against fire and smoke chimney-effect on high buildings by means of fire walls.

110. The method of claim 101, wherein said vehicle uses the engine assembly for driving and for stopping its movement.

\* \* \* \* \*